US012291923B2

(12) United States Patent
Chen

(10) Patent No.: US 12,291,923 B2
(45) Date of Patent: May 6, 2025

(54) DUAL BLIND CURTAIN PROVIDED WITH DIVIDED TAPE BELT

(71) Applicant: Choon Koo Chen, Incheon (KR)

(72) Inventor: Choon Koo Chen, Incheon (KR)

( * ) Notice: Subject to any disclaimer, the term of this patent is extended or adjusted under 35 U.S.C. 154(b) by 137 days.

(21) Appl. No.: 17/922,595

(22) PCT Filed: Mar. 26, 2020

(86) PCT No.: PCT/KR2020/004084
§ 371 (c)(1),
(2) Date: Oct. 31, 2022

(87) PCT Pub. No.: WO2020/204454
PCT Pub. Date: Oct. 8, 2020

(65) Prior Publication Data

US 2023/0349228 A1 Nov. 2, 2023

(30) Foreign Application Priority Data

Mar. 30, 2019 (KR) ........................ 10-2019-0037556
Sep. 26, 2019 (KR) ........................ 10-2019-0118895
Mar. 25, 2020 (KR) ........................ 10-2020-0036341

(51) Int. Cl.
*E06B 9/42* (2006.01)
*E06B 9/78* (2006.01)
(Continued)

(52) U.S. Cl.
CPC .................. *E06B 9/42* (2013.01); *E06B 9/78* (2013.01); *E06B 2009/2405* (2013.01); *E06B 2009/405* (2013.01)

(58) Field of Classification Search
CPC ..... E06B 9/42; E06B 9/78; E06B 9/40; E06B 9/56; E06B 2009/405; E06B 2009/2405;
(Continued)

(56) References Cited

U.S. PATENT DOCUMENTS 7,681,618 B2 * 3/2010 Nicolosi ................ E06B 9/264 160/241
8,887,787 B2 * 11/2014 Jang .......................... E06B 9/42 160/241
(Continued)

FOREIGN PATENT DOCUMENTS

KR 10-0866344 B1 10/2008
KR 20-0444675 Y1 5/2009
(Continued)

*Primary Examiner* — Johnnie A. Shablack

(57) ABSTRACT

The present invention relates to a dual blind curtain installed at an indoor window, a wall surface, or the like and is used for purposes such as view blocking, light adjustment, heating, and indoor interior decoration effects, wherein: both opposite ends of a curtain sheet composed by connecting multiple patterns to each other are wound in roll shapes around two rotation shafts, respectively, and then curtain circulative rotation and curtain longitudinal rotation are allowed to be freely adjusted by the two rotation shafts; and a difference between the amounts of winding and unwinding of the curtain sheet around and from the rotation shafts, respectively, the difference being caused due to a change in the amount of winding of the curtain sheet around a corresponding shaft, can be identically maintained. Accordingly, the curtain sheet wound around the rotation shafts can be freely changed in patterns that a consumer wants.

5 Claims, 13 Drawing Sheets

(51) Int. Cl.
*E06B 9/24* (2006.01)
*E06B 9/40* (2006.01)

(58) Field of Classification Search
CPC ..... E06B 2009/2423; E06B 2009/2477; E06B 2009/2458; E06B 2009/2452
See application file for complete search history.

(56) References Cited

U.S. PATENT DOCUMENTS

| | | | | |
|---|---|---|---|---|
| 9,249,620 | B2 * | 2/2016 | Kim | E06B 9/264 |
| 2019/0153777 | A1 * | 5/2019 | Byun | E06B 9/42 |
| 2020/0263493 | A1 * | 8/2020 | An | E06B 9/50 |
| 2022/0412161 | A1 * | 12/2022 | Strand | E06B 9/40 |
| 2023/0332465 | A1 * | 10/2023 | Dimitrakoudis | E06B 9/42 |
| 2023/0349228 | A1 * | 11/2023 | Chen | E06B 9/66 |

FOREIGN PATENT DOCUMENTS

| | | | |
|---|---|---|---|
| KR | 10-2017-0030003 | A | 3/2017 |
| KR | 10-2018-0000311 | A | 1/2018 |
| KR | 20-2088756 | Y1 | 8/2020 |

* cited by examiner

DUAL BLIND CURTAIN PROVIDED WITH DIVIDED TAPE BELT

TECHNICAL FIELD

The present invention relates to a blind curtain, which is installed at an indoor window, an indoor wall surface, or the like and is used to obtain effects such as view blocking, light adjustment, heating, and indoor interior decoration. Specifically, the present invention relates to a dual blind curtain, in which when an operation of unfolding or winding up a curtain sheet is performed by winding opposite ends of a curtain sheet, which is formed by connecting a plurality of patterns to each other, around two winding shafts in a roll shape, respectively, and then rotating the two winding shafts, the two winding shafts can be freely adjusted to rotate facing each other or rotating along each other, thereby freely adjusting the curtain sheet wound around the winding shaft into a pattern that a consumer wants.

BACKGROUND ART

In general, blind curtains are used to block outdoor sunlight, protect indoor privacy, and improve indoor aesthetics, and the blind curtains are used in various forms, such as vertical blinds, horizontal blinds, overlapping-type blinds, or roll-type blinds.

Among them, in detail, the roll-type blind has a typical configuration in which a screen is wound on an outer periphery surface, a winding pipe provided at an end thereof with a handle is installed on an upper portion of an opening, the winding pipe is provided therein with a clutch and a rotation shaft, and an operative string is installed on one end of the winding pipe to interwork with the rotation shaft.

In the roll-type blind having the configuration as described above, the screen is wound or unfolded by selective pulling of the operative string, which is wound around the rotation shaft and divided into two strings to fall down.

The existing blind curtain satisfies the needs of consumers to some extent in terms of practicality, but does not satisfy the needs of various consumers in terms of interior decoration, which is another purpose of curtains. This is because in general the blind curtain uses a curtain sheet including one pattern, so that unless the entire blind curtain is replaced, there is no choice but to see the same curtain sheet all the time, resulting in a considerable problem in trying to obtain various effects required by customers, such as when trying to change interior decoration.

In order to satisfy the various needs for the interior decoration of customers as described above, the present inventor has solved the problem by installing a dual winding roll having two rotation shafts on a curtain model manufactured by connecting two or more curtain sheets in a height direction. Therefore, a device, in which two winding rolls are connected to each other to operate a plurality of curtain sheets, needs to have a unit that identically maintains an amount of the curtain unwinding from one shaft and an amount of the curtain winding around the other shaft due to a difference between the amounts of the curtains wound around the shafts, respectively. In this regard, there is a specialty that a rotation ratio at the center of the shaft is not always the same even when the amount of rotation at an outer diameter of the shaft wound with the curtain is the same. Such a specialty is special because high and low rotation ratios are present together, other than the rotation ratio of any one shaft is always high or low, and thus it is difficult to smoothly transmit power in any cases. This phenomenon has been solved using a curtain device, which is provided with a tape belt-type power transmission device and a rotation direction selection unit, devised by the present inventor.

In addition, two important functions of a configuration of a double blind of the present invention may be divided into a curtain circulation device and a curtain vertical opening/closing device, in which the curtain circulation device solves the problem through the tape belt and the rotation direction selection unit, and the curtain vertical opening/closing device solves the problem through a clutch and a push button assembly for operating the clutch, and solves the problem through a scissor clutch and a ball chain guide device instead of the push button assembly, such that it allows consumers to smoothly operate the dual blind by using a sense of use that is the same as that of existing blind products in the market.

However, in the previous invention, since the tape belt is driven through a sprocket provided in the scissor clutch by forming a hole in the tape belt in order to vertically open and close the curtain, it is not easy to secure durability of the tape belt, and as the tape belt is installed through a free fall to a height that is the same as an opening/closing height of the curtain, separate measures are thus required to secure safety related to the prevention of the tape belt from winding around a child's neck, so there is a need to provide a device for solving the above problem.

DISCLOSURE

Technical Problem

Therefore, the present invention has been devised to solve the problems, and an object of the present invention is to provide a dual blind curtain that may maximize practicality and durability by radically innovating functional limitations of existing technologies, also eliminating configurations of a rotary gear part, the push button assembly, the scissor clutch, and a lifting device part in the previous invention to construct simplicity and secure the stability by removing exposure of the tape belt, and facilitating the curtain circulation operation and the curtain vertical opening/closing operation by still satisfying a condition in which the dual blind curtain is operated by selectively connecting a rotation force to two shafts according to a rotation direction of a center sprocket, regardless of a difference occurred in a unique rotation amount required by each shaft of the connected rotations of two shafts as necessary and sufficient components.

Technical Solution

There is provided a dual blind curtain including: a body frame (100) including an upper plate (110) that forms an upper surface, side plates (120) that are provided on both sides of a bottom surface of the upper plate (110) and formed with a plurality of shaft holes (150), and one or more partition plates (130) that are provided inside the bottom surface of the upper plate (110) and formed with a plurality of shaft holes (150);

a B driving part (200) comprising: a first rotation direction selection part (501) including a center shaft (551) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center sprocket (571) that is installed on one side of the center shaft (551) and provided with a ball chain (571*c*) to generate a rotation force, a second idle gear clutch (521*b*) that is installed to idle around the center shaft (551), provided with a unidirectional connection port (52-*b*) in one side thereof, and engaged with a main pulley primary gear (511*a*), a first idle gear clutch (521*a*) that idles on the center shaft (551), is provided with a unidirectional connection port (52-*a*) in one side thereof to face the second idle gear clutch (521*b*) at a predetermined interval, and engages with an auxiliary pulley primary gear (511*c*), a center nut (531) that is positioned between the first and second idle gear clutches (521*a* and 521*b*), provided on an inner surface of a body thereof with a nut groove (53-1), and installed so that the body idles at the shaft hole (150) of the partition plate (130), and a center bolt (541) that rotates in an inner portion of the center nut (531), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1);

a main pulley shaft (27B1) that is installed to idle on the partition plate (130), which is provided inside the bottom surface of the upper plate (110) of the body frame (100) and formed with the plurality of holes (150); a main pulley (26B1) that is constantly coupled to the main pulley shaft (27B1) and rotates; the main pulley primary gear (511*a*) that engages with the second idle gear clutch (521*b*) of the first rotation direction selection part (501) to transmit the rotation force to the main pulley (26B1); a main pulley secondary gear (511*b*) that engages with a center gear (563) of a connection driving part (400) and transmits the rotation force transmitted to the main pulley (26B1); a winding rod connection port (290*a*) that connects the rotation force generated in the main pulley (26B1) to a winding rod (630*a*);

an auxiliary pulley (26B2) that is constantly coupled to an auxiliary pulley shaft (27B2) and rotates, in which the auxiliary pulley (26B2) is installed to idle on the partition plate (130), which is provided inside the bottom surface of the upper plate (110) of the body frame (100) and formed with the plurality of shaft holes (150); an auxiliary pulley primary gear (511*c*) that engages with the first idle gear clutch (521*a*) of the first rotation direction selection part (501) to transmit the rotation force to the auxiliary pulley (26B2); an auxiliary pulley secondary gear (511*d*) that engages with a center gear (564) of the connection driving part (400) and transmits the rotation force transmitted to the auxiliary pulley (26B2); and a tape belt B (28B) that connects the rotation force of the main pulley (26B1) or the rotation force of the auxiliary pulley (26B2) to each other and is connected to central axes of the main pulley (26B1) and the auxiliary pulley (26B2) to be wound in a stacked manner;

a D driving part (300) comprising: a second rotation direction selection part (502) including a center shaft (552) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center sprocket (572) that is installed on one side of the center shaft (552) and provided with a ball chain (572*c*) to generate a rotation force, a first idle gear clutch (522*a*) that is installed to idle around the center shaft (552), provided with a unidirectional connection port (52-*a*) in one side thereof, and engaged with a main pulley primary gear (512*a*), a second idle gear clutch (522*b*) that idles on the center shaft (552), is provided with a unidirectional connection port (52-*b*) in one side thereof to face the first idle gear clutch (522*a*) at a predetermined interval, and engages with an auxiliary pulley primary gear (512*c*), a center nut (532) that is positioned between the first and second idle gear clutches (522*a*, 522*b*), provided on an inner surface of a body thereof with a nut groove (53-1), and installed so that the body idles at the shaft hole (150) of the partition plate (130), and a center bolt (542) that rotates in an inner portion of the center nut (532), has a sliding hole (54-2) formed in a center of a body thereof to move left and right of the locking protrusion (55-1), is provided with unidirectional connection ports (54-*a* and 54-*b*) on both sides of the bolt body (54-1), respectively, and is provided with a bolt thread (54-3) on an outer circumferential surface of the bolt body (54-1);

a main pulley shaft (27D1) that is installed to idle on the partition plate (130), which is provided inside the bottom surface of the upper plate (110) of the body frame (100) and formed with the plurality of holes (150); a main pulley (26D1) that is constantly coupled to the main pulley shaft (27D1) and rotates; a main pulley primary gear (512*a*) that engages with the first idle gear clutch (522*a*) of the second rotation direction selection part (502) to transmit the rotation force to the main pulley (26D1); a main pulley secondary gear (512*b*) that engages with a connection gear set (240) of the connection driving part (400) and transmits the rotation force transmitted to the main pulley (26D1); a winding rod connection port (290*b*) that connects the rotation force generated in the main pulley (27D1) to a winding rod (630*b*);

an auxiliary pulley (26D2) that is constantly coupled to an auxiliary pulley shaft (27D2) and rotates, in which the auxiliary pulley (26D2) is installed to idle on the partition plate (130), which is provided inside the bottom surface of the upper plate (110) of the body frame (100) and formed with the plurality of shaft holes (150); an auxiliary pulley primary gear (512*c*) that engages with the second idle gear clutch (522*b*) of the second rotation direction selection part (502) to transmit the rotation force to the auxiliary pulley (26D2); an auxiliary pulley secondary gear (512*d*) that engages with a connection gear set (230) of the connection driving part (400) and transmits the rotation force transmitted to the auxiliary pulley (26D2); and a tape belt D (28D) that connects the rotation force of the main pulley (26D1) or the rotation force of the auxiliary pulley (26D2) to each other and is connected to central axes of the main pulley (26D1) and the auxiliary pulley (26D2) to be wound in a stacked manner;

the connection driving part (400) comprising: a third rotation direction selection part (503) including a center shaft (553) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center gear (563) that is installed on one side of the center shaft (553) and engaged with the main pulley secondary gear (511*b*) of the B driving part (200) to receive the rotation force, a first idle gear clutch (523*a*) that is installed to idle around the center shaft (553) and provided with a unidirectional connection port (52-*a*) in one side thereof, a second idle gear clutch (523*b*) that idles on the center shaft (553) and is provided with a unidirectional connection port (52-*b*) in one side thereof to face the first idle gear clutch (523*a*) at a predetermined interval, a center nut (533) that is positioned between the first and second idle gear clutches (523*a* and 523*b*), provided on an inner surface of a body thereof with a nut groove (53-1), and installed so that the body idles at the shaft hole (150) of the partition plate (130), a center bolt (543) that rotates in an inner portion of the center nut (533), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1), and the connection gear set (230) that engages with the auxiliary pulley secondary gear (512*d*) and transmits the rotation force of the second idle gear clutch (523*b*) to the auxiliary pulley secondary gear (512*d*); and the fourth rotation direction selection part (504) including a center shaft (554) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center gear (564) that is installed on one side of the center shaft (554) and engaged with the auxiliary pulley secondary gear (511*d*) of the B driving part (200) to receive the rotation force, a first idle gear clutch (524*a*) that is installed to idle around the center shaft (554) and provided with a unidirectional connection port (52-*a*) in one side thereof, a second idle gear clutch (524*b*) that idles on the center shaft (553) and is provided with a unidirectional connection port (52-*b*) in one side thereof to face the first idle gear clutch (524*a*) at a predetermined interval, a center nut (533) that is positioned between the first and second idle gear clutches (524*a* and 524*b*), provided on an inner surface of a body thereof with a nut groove (53-1), and installed so that the body idles at the shaft hole (150) of the partition plate (130), a center bolt (543) that rotates in an inner portion of the center nut (533), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1), and the connection gear set (240) that engages with the main pulley secondary gear (512*b*) and transmits the rotation force of the first idle gear clutch (524*a*) to the main pulley secondary gear (512*b*); and a curtain part (600) installed to idle on the side plate (120) and the partition plate (130), which is provided inside the bottom surface of the upper plate (110) of the body frame (100) and formed with the plurality of shaft holes (150), and including a curtain sheet (610) that is made by connecting one or more various pattern sheets and has one end wound around the winding rod (630*a*) connected by the winding rod connection ports (290*a* and 290*b*) and an opposite end wound around another winding rod (630*b*) by the rotation force of the main pulley shafts (27B1 and 27D1), and a weight bar (620) that is formed on a center of the curtain sheet (610) wound around opposite ends thereof.

Advantageous Effects

When the double blind curtain according to the present invention is provided, effects of creating various types of curtain can be expected using one product of the present invention, such as creating various interior atmospheres of a curtain sheet on which various photos are printed, selecting a curtain sheet having different patterns and a configuration of mesh sheet-stripe sheet-mesh sheet-translucent sheet-mesh sheet-blackout sheet according to an amount of sunlight and selected for the purpose of covering upper and lower ranges of view and day and night, and using a curtain sheet on which a message is recorded for learning and publicity through an automatic circulation operation.

Further, a danger of winding around the child's neck can be removed by constructing simplicity of the configuration and removing the exposure of the tape belt, and simultaneously, a function of facilitating the curtain circulation operation and the curtain vertical opening/closing operation by satisfying a condition in which the dual blind curtain is operated by selectively connecting a rotation force to two shafts according to the rotation direction of the center sprocket, regardless of a difference occurred in a unique rotation amount required by each shaft of the connected rotations of two shafts as necessary and sufficient components of the device.

BEST MODE

Hereinafter, preferred embodiments will be described in detail with respect to the accompanying drawings.

Figure 1:
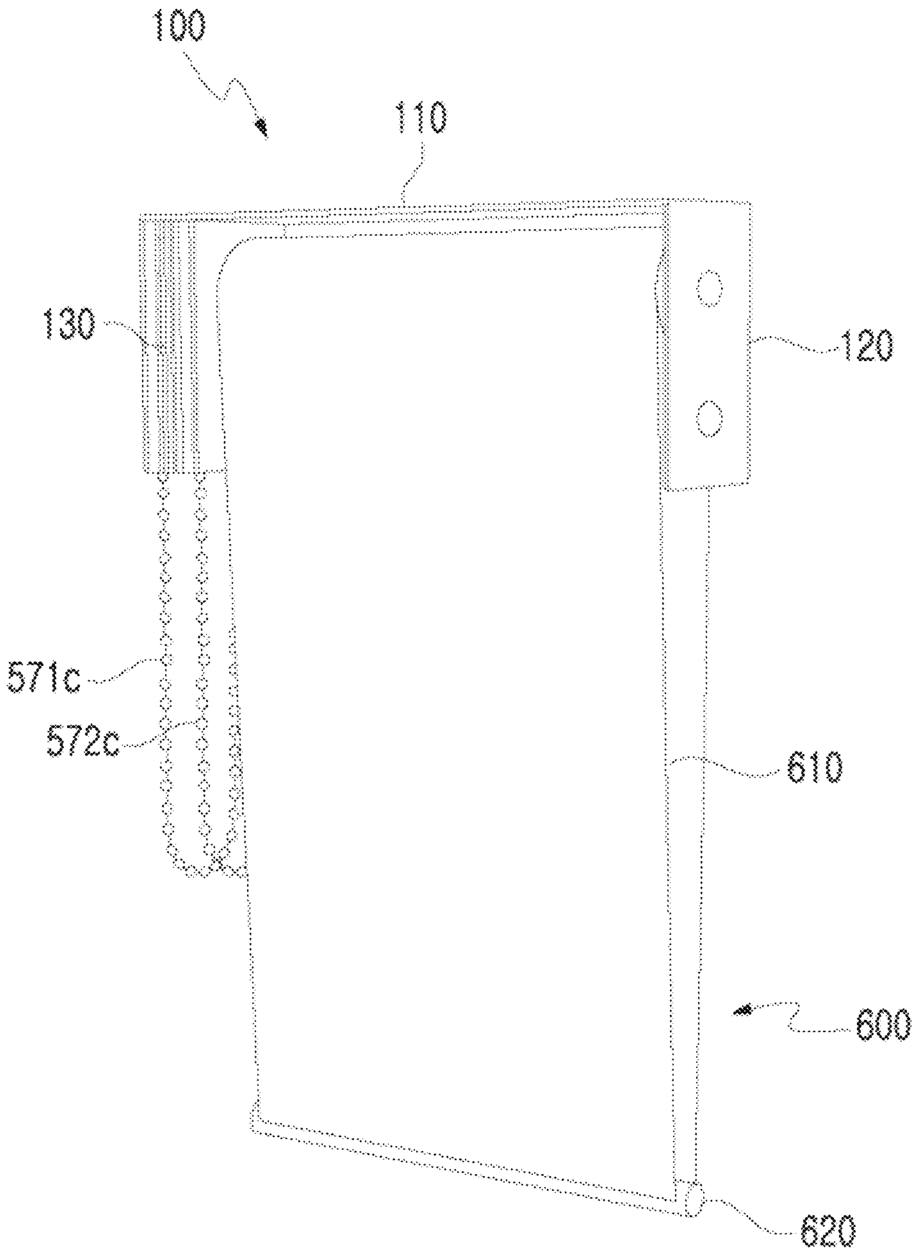
FIG. 1 is an external perspective view.
Figure 2:
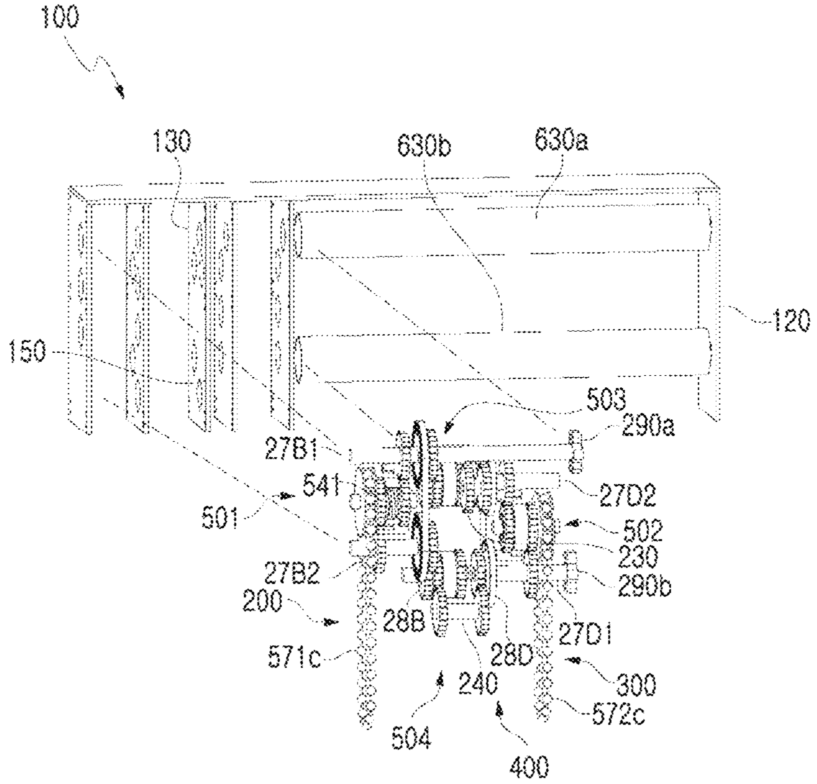
FIG. 2 is a perspective view representing a body frame and main driving parts.

As shown in the accompanying drawings (see FIGS. 1 and 2) of the present invention, a dual blind curtain is provided with two winding rods 630*a* and 630*b* inside a body frame 100 and formed with a curtain sheet 610 wound around the winding rods 630*a* and 630*b*, a B driving part 200, a D driving part 300, and a connection driving part 400 for changing a rotation direction of the winding rods 630*a* and 630*b*.

The body frame 100 includes an upper plate 110 that forms an upper surface, side plates 120 that are provided on both sides of a bottom surface of the upper plate 110 and formed with a plurality of shaft holes 150, and one or more partition plates 130 that are provided inside the bottom surface of the upper plate 110 and formed with a plurality of shaft holes 150.

As shown in the accompanying drawing (see FIG. 2), a curtain part 600 provided inside the body frame 100 directly connects rotation forces of a main pulley shaft 27B1 of the B driving part 200 and a main pulley shaft 27D1 of the D driving part 300 to the winding rods 630*a* and 630*b* by winding rod connection ports 290*a* and 290*b* provided on an end thereof, or transmits the rotation forces by a method of adding another tool for transmitting power such as a chain, such that the curtain sheet 610 is vertically or circulatively wound.

Figure 3:
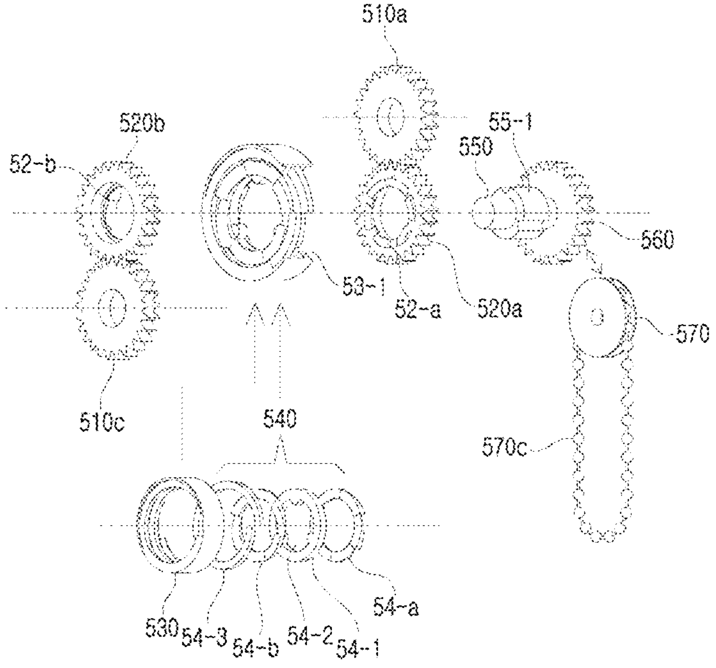
FIG. 3 is an exploded perspective view of a rotation direction selection part.

The B driving part 200, the D driving part 300, and the connection driving part 400 are driven by a rotation force of center sprockets 571 and 572 rotated by ball chains 571*c* and 572*c*, which are manually operated by a user, the same operation principle applies to the B driving part 200 including a first rotation direction selection part 501 and a tape belt B 28B, the D driving part 300 including a second rotation direction selection part 502 and a tape belt D 28D, and the connection driving part 400 including a third rotation direction selection part 503 and a fourth rotation direction selection part 504, and the B driving part 200, the D driving part 300, and the connection driving part 400 will be collectively referred to as a rotation direction selection part 500 and first described with reference to the drawing (see FIG. 3).

As shown in the drawing (see FIG. 3), a center shaft 550 is installed to rotate in a shaft hole 150 formed in the partition plate 130, and a center gear 560 installed on one end of the center shaft 550 engages with another power to apply the rotation force to the center shaft 550 and may be installed in conjunction with the center sprocket 570 applied with the rotation force by the ball chain 570*c*. Meanwhile, the rotation force of the center gear 560 is transmitted to a center bolt 540 together with a locking protrusion 55-1 of the center shaft 550, in which the center gear 560 is installed to idle on opposite ends of the locking protrusion 55-1 and positioned between first and second idle gear clutches 520*a* and 520*b* provided with unidirectional connection ports 52-*a* and 52-*b* on one side thereof facing each other, and in a rotation method of the center bolt 540, a bolt thread 54-3 provided on an outer circumferential surface of a bolt body 54-1 is rotated forward and rearward along a guide direction of a nut groove 53-1 provided in an inner surface of the center nut 530 by the rotation force of the locking protrusion 55-1 fitted into a sliding hole 54-2 formed at the center of the bolt body 54-1, and thus the bolt body 54-1 rotates while sliding forward and rearward the locking protrusion 55-1. In this case, unidirectional connection ports 54-*a* and 54-*b* are provided on both sides of the bolt body 54-1 and connected to one of the corresponding unidirectional connection ports 52-*a* and 52-*b* provided in first and second idle gear clutches 520*a* and 520*b*. After one of the first and second idle gear clutches 520*a* and 520*b* are connected to the center bolt 540 slid in any one direction of the locking protrusion 55-1, the center bolt 540 does not move further in a direction in which it moves inside the center nut 530, and a body of the center nut 530 is installed to idle in the shaft hole 150 of the partition plate 130 to maintain the connected rotation direction until the rotation direction of the center shaft 550 is switched to an opposite direction by the center gear 560. A rotation force generated in the first and second idle gear clutches 520*a* and 520*b* is transmitted to the main pulley primary gear 510*a* and an auxiliary pulley primary gear 510*c* through a connection path.

With the same configuration and principle as described in the rotation direction selection part 500, the first rotation direction selection part 501, the second rotation direction selection part 502, the third rotation direction selection part 503, and the fourth rotation direction selection part 504 selectively transmit the rotation force and the rotation direction of the center sprockets 571 and 572 or the center gears 563 and 564 to the first idle gear clutches 521*a*, 522*a*, 523*a*, and 524*a* and second idle gear clutches 521*b*, 522*b*, 523*b*, and 524*b*.

Figure 4:
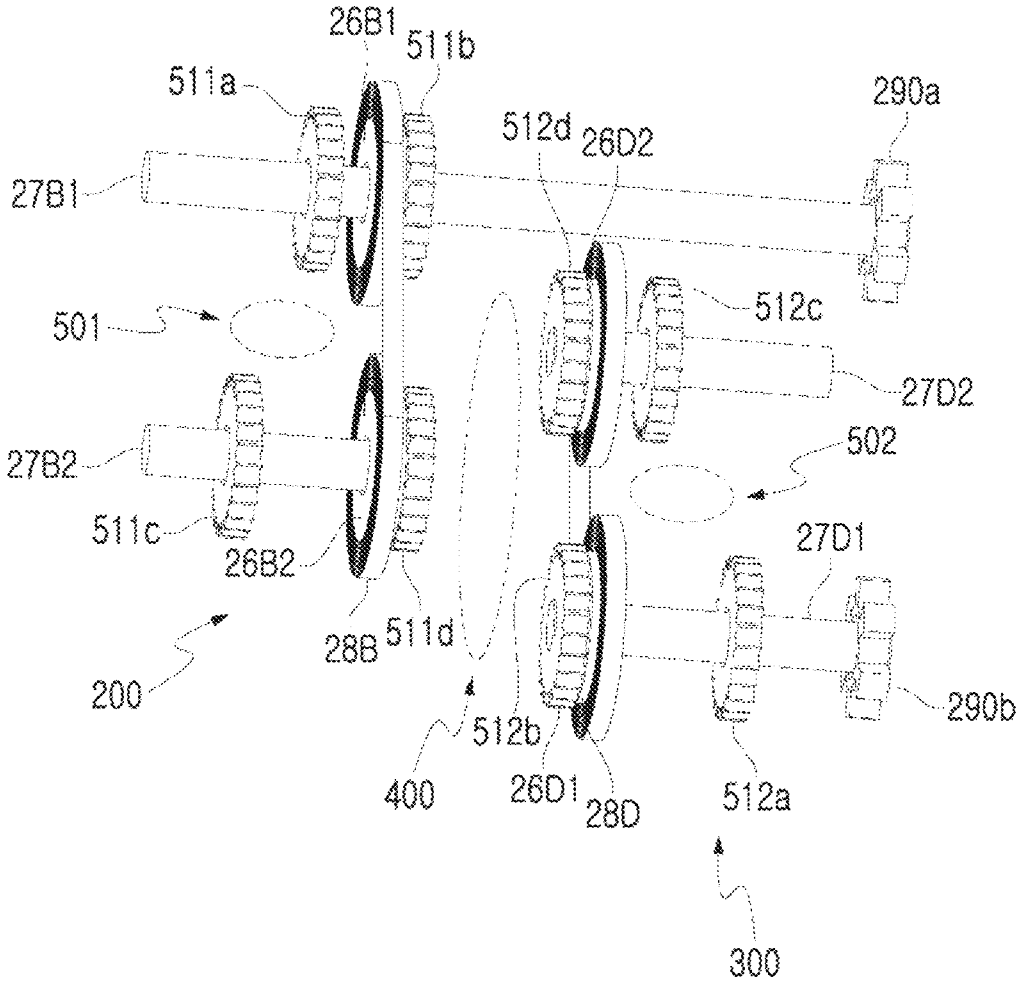
FIG. 4 is a perspective view representing a connection between a tape belt and a shaft.

The following describes a connection between the tape belt B 28B, the tape belt D 28D, and a shaft with respect to the drawing (see FIG. 4).

As described in the configuration collectively referred to as the rotation direction selection part 500, when the rotation direction of the center sprocket 571 is determined by the ball chain 571*c* pulled in any one direction of the first rotation direction selection part 501, the rotation force is selectively transmitted to either a main pulley primary gear 511*a* provided on the main pulley shaft 27B1 engaged with the first idle gear clutch 521*a* or an auxiliary pulley primary gear 511*c* provided on the auxiliary pulley shaft 27B2 engaged with the second idle gear clutch 521*b* accordingly, and in this case, a main pulley 26B1 rotating together with the main pulley primary gear 511*a* and an auxiliary pulley 26B2 rotating together with the auxiliary pulley primary gear 511*c* are connected to each other by the tape belt B 28B. In such a configuration, the tape belt B 28B is stacked on and wound around the main pulley 26B1 and the auxiliary pulley 26B2 according to the rotation of the shaft, like the curtain sheet 610 wound around the winding rods 630*a* and 630*b*, thereby serving to transmit the rotation force of one of the two shafts 27B1 and 27B2 to each other.

Meanwhile, when the rotation direction of a center sprocket 572 is determined by a ball chain 572*c* pulled in any one direction from the second rotation direction selection part 502 in the same manner as the configuration and connection structure of the first rotation direction selection part 501 and the tape belt B 28B, the rotation force is selectively transmitted to either the main pulley primary gear 512*a* provided on the main pulley shaft 27D1 engaged with the first idle gear clutch 522*a* or the auxiliary pulley primary gear 512*c* provided on the auxiliary pulley shaft 27D2 engaged with the second idle gear clutch 522*b* accordingly, and in this case, a main pulley 26D1 rotating together with the main pulley primary gear 512*a* and an auxiliary pulley 26D2 rotating together with the auxiliary pulley primary gear 512*c* are connected to each other by the tape belt D 28D. In such a configuration, the tape belt D 28D is stacked on and wound around the main pulley 26D1 and the auxiliary pulley 26D2 according to the rotation of the shaft, like the curtain sheet 610 wound around the winding rods 630*a* and 630*b*, thereby serving to transmit the rotation force of one of the two shafts 27D1 and 27D2 to each other.

Describing the tape belts 28B and 28D in more detail, the tape belt B 28B and the tape belt D 28D have the same shape and function, but a winding direction of the curtain sheet 610 according to a direction of the shaft rotation may be manipulated in an intended circulation direction or a vertical direction when an installation direction is formed to have a winding shape symmetrical by 180 degrees, and the number of winding rotations of the tape belts 28B and 28D wound around the main pulleys 26B1 and 26D1, respectively needs to have the number of winding rotations the same as that of the curtain sheet 610 wound around the winding rods 630*a* and 630*b* corresponding to each other. In addition, as shown in the drawing (see FIG. 6), the main pulley 26B1 of the B driving part 200 and the auxiliary pulley 26D2 of the D driving part 300 are connected to each other, and the main pulley 26D1 of the D driving part 300 and the auxiliary pulley 26B2 of the B driving part 200 are respectively connected. In this case, outer diameters of the tape belts 28B and 28D wound around the corresponding pulleys 26B1:26D2 and 26D1:26B2 are to be maintained at the same size.

This is because the rotation force is selectively connected to two shafts according to the rotation direction of the center sprocket regardless of a difference occurred in a unique rotation amount required by each shaft in the rotation of connected two shafts, which is the main principle of the present invention, thus satisfying a condition of manipulating the operation of the curtain as intended.

The following is a description that the B driving part 200 and the D driving part 300 are connected to the rotation force by the connection driving part 400. First, as described in the rotation direction selection part 500 and as shown in the drawing (see FIG. 6), in the third rotation direction selection part 503, a center gear 563 that replaces the center sprocket 570 is provided on one end of a center shaft 553 installed to idle on the partition plate 130, which is provided inside the bottom surface of the upper plate 110 of the body frame 100 and formed with the plurality of shaft holes 150, and is connected with the rotation force through a connection gear set 230 installed to engage with the second idle gear clutch 523*b* in order to engage and receive the rotation force of the main pulley secondary gear 511*b* of the B driving part 200 to engage and transmit the rotation force to the auxiliary pulley secondary gear 512*d* of the D driving part 300.

Next, as described in the rotation direction selection part 500 and as shown in the drawing (see FIG. 6), in the fourth rotation direction selection part 504, a center gear 564 that replaces the center sprocket 570 is provided on one end of a center shaft 554 installed to idle on the partition plate 130, which is provided inside the bottom surface of the upper plate 110 of the body frame 100 and formed with the plurality of shaft holes 150, and is connected with the rotation force through a connection gear set 240 installed to engage with the first idle gear clutch 524*a* in order to engage and receive the rotation force of the auxiliary pulley secondary gear 511*d* of the B driving part 200 to engage and transmit the rotation force to the main pulley secondary gear 512*b* of the D driving part 300.

In this case, the configuration of the connection gear sets 230 and 240 serves to transmit the same rotation ratio and rotation direction as a component that is provided with a pair of connection gears 233*a*:233*b*, and 244*a*:244*b* on opposite ends of connection gear shafts 233*c* and 244*c* installed to rotate on the partition plate 130, which is provided inside the bottom surface of the upper plate 110 of the body frame 100 and formed with the plurality of shaft holes 150, and engages with each gear.

Figure 5:
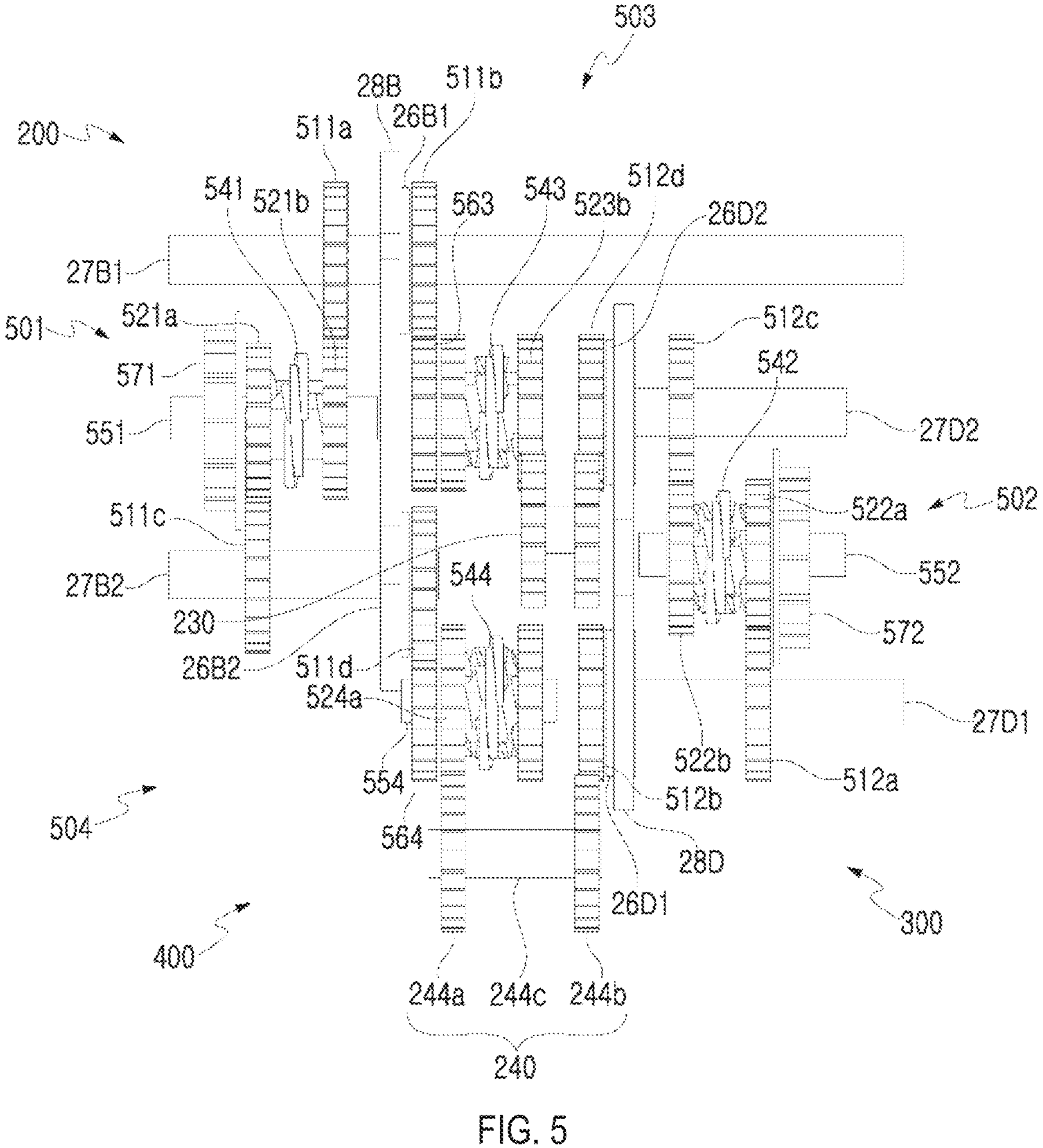
FIG. 5 is a perspective view of driving parts which are arranged in a plane.
Figure 6:
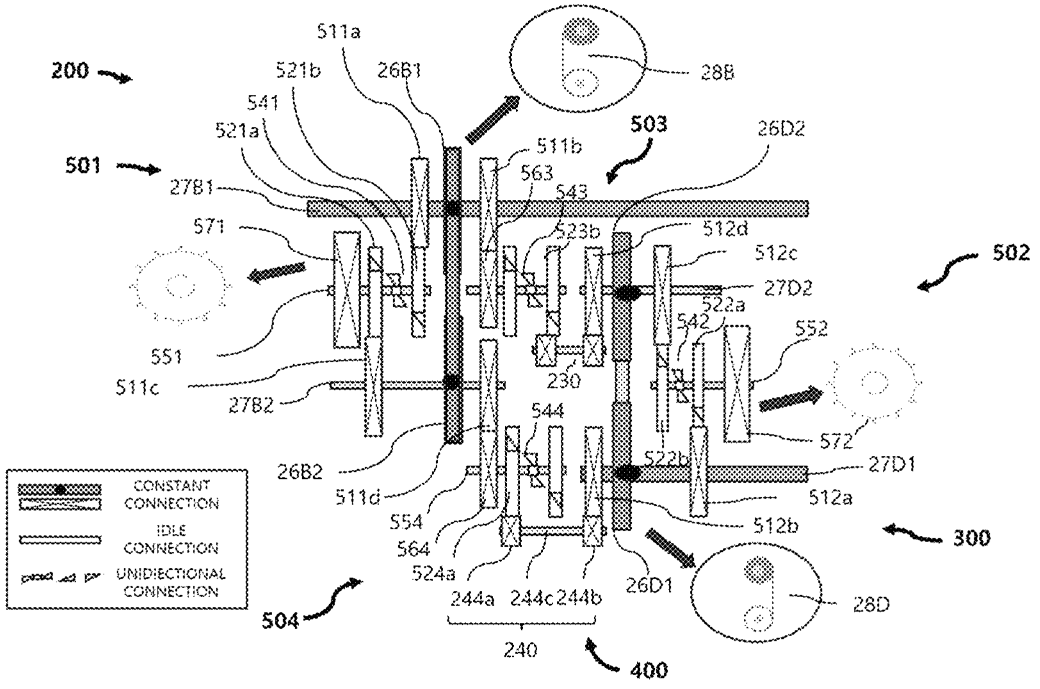
FIG. 6 is a schematic view of FIG. 5.

Hereinabove, in order to explain an operation procedure for forming each configuration provided in the present invention, FIG. 5 is a schematic view of a driving part in a planar arranged manner and FIG. 6 is a schematic view of FIG. 5, in which FIG. 6 is a basic view for systematically understanding a connection state of each configuration and a process for transmitting the rotation direction and the driving force of each step by indicating the rotation direction with an arrow. However, this is a drawing clarified to faithfully represent only the process for transmitting the rotation direction by omitting the center nuts 531, 532, 533, and 534 of the rotation direction selection parts, respectively.

Figure 7:
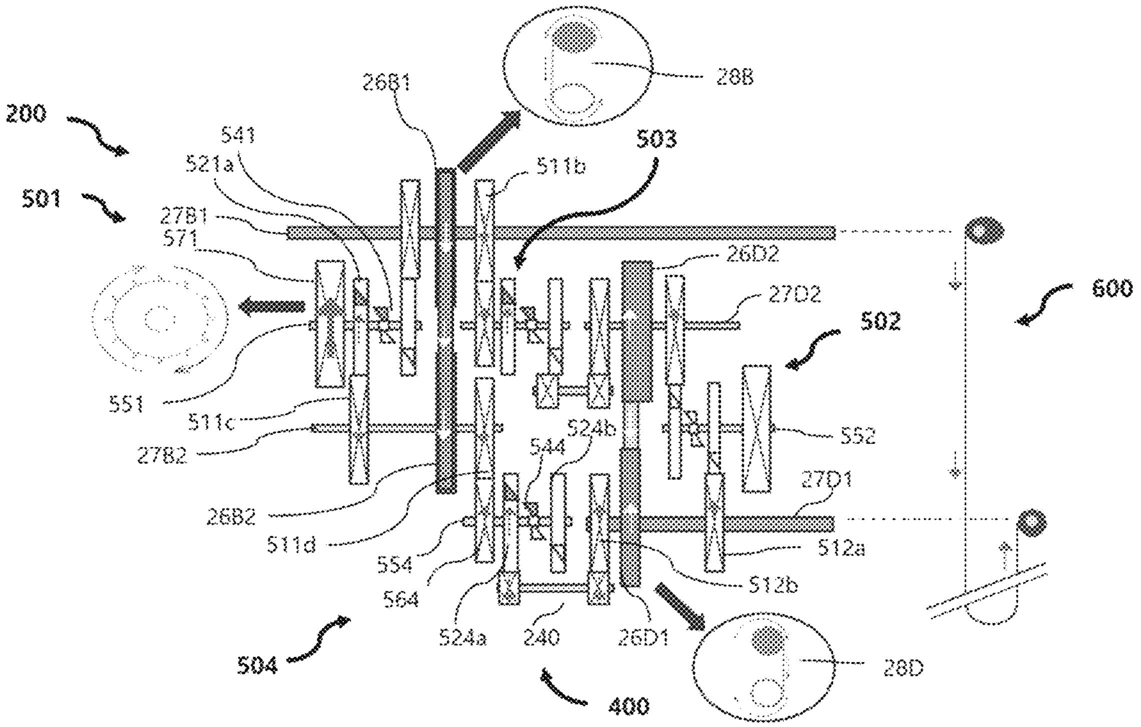
FIG. 7 is a schematic view of a process for transmitting a rotation force of curtain sheet downward circulation drive.
Figure 8:
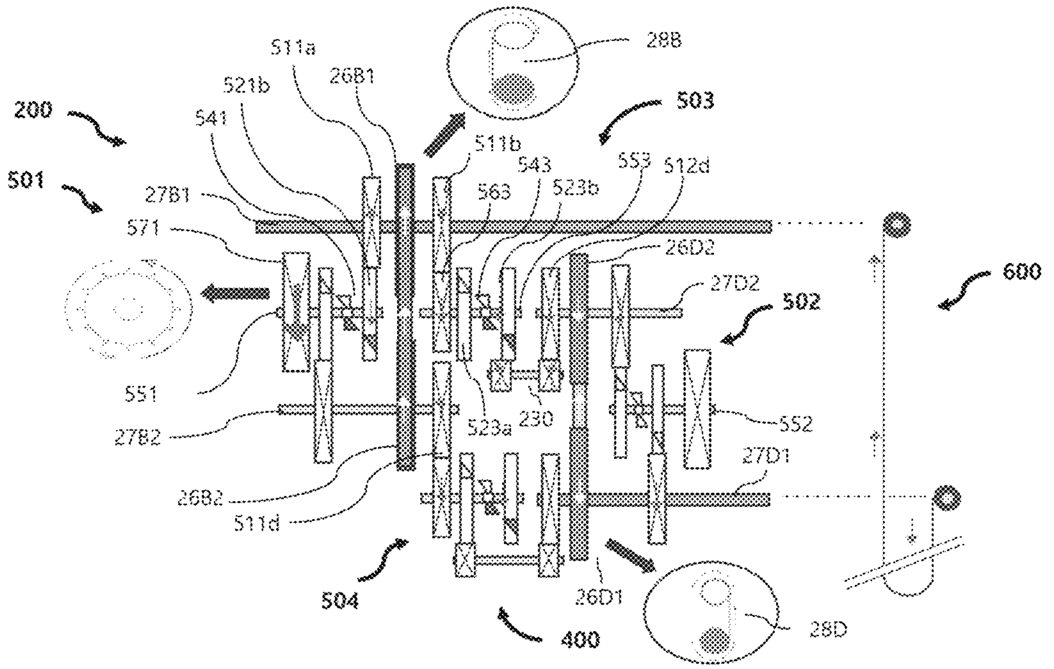
FIG. 8 is a schematic view of a process for transmitting a rotation force of curtain sheet upward circulation drive.
Figure 9:
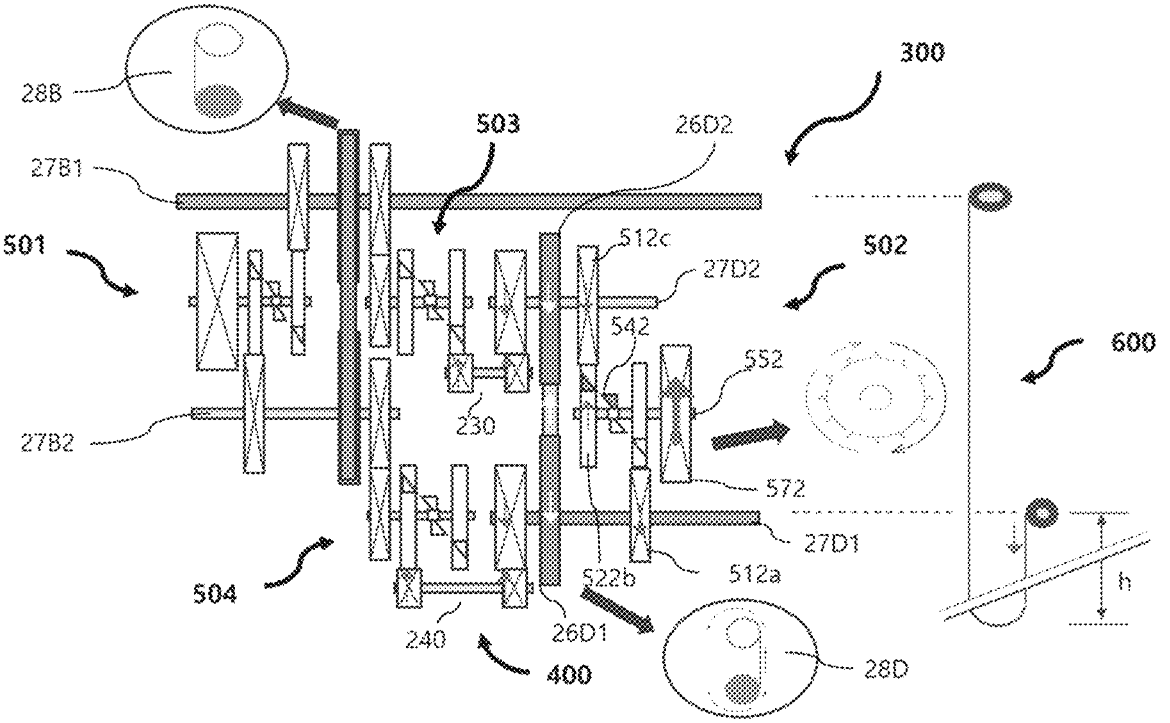
FIG. 9 is a schematic view of a process for transmitting a rotation force of curtain sheet pulling-down drive.
Figure 10:
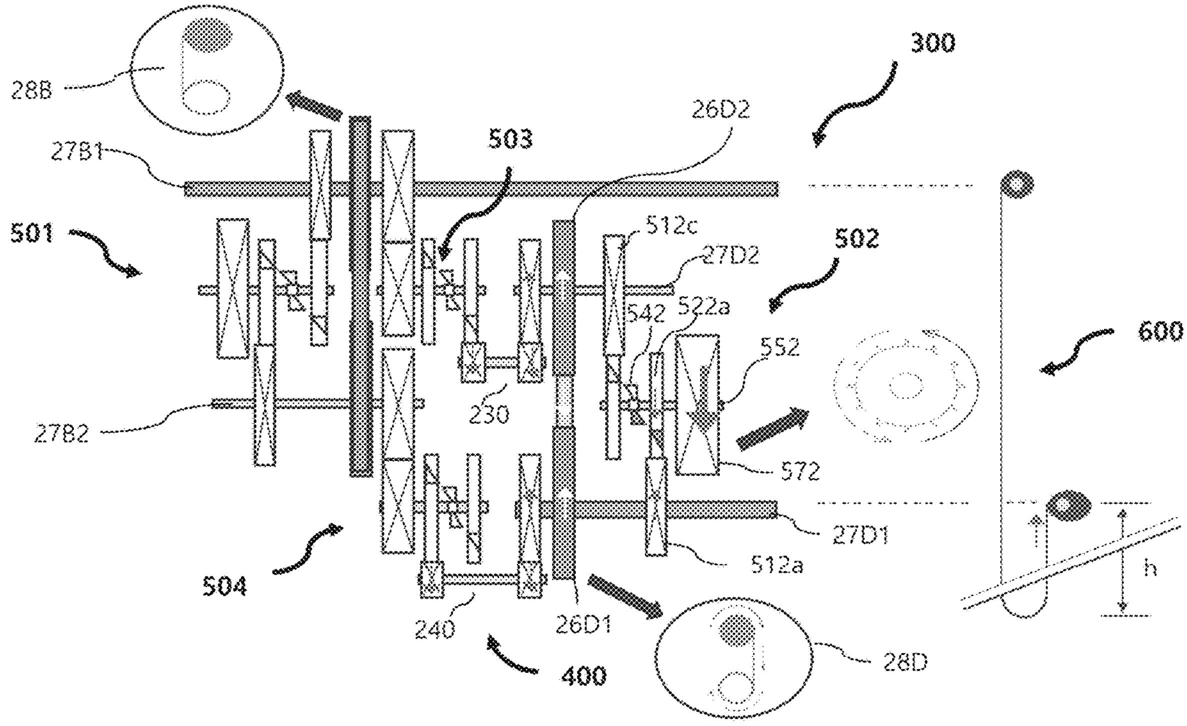
FIG. 10 is a schematic view of a process for transmitting a rotation force of curtain sheet pulling-up drive.

FIG. 7 is a schematic view of a process for transmitting a rotation force of curtain sheet downward circulation device, FIG. 8 is a schematic view of a process for transmitting a rotation force of curtain sheet upward circulation drive, FIG. 9 is a schematic view of a process for transmitting a rotation force of curtain sheet pulling-down drive, and FIG. 10 is a schematic view of a process for transmitting a rotation force of curtain sheet pulling-up drive.

Each operation method may be easily understood by applying the configuration and operation principle described in the rotation direction selection part 500 along a direction of the arrow, the general power transmission theory, the rotation principle of the engaging gear, the rotation principle of the rotation shaft connected by the belt, and the like, and thus additional description thereof will be omitted.

Meanwhile, after the entire curtain sheet 610 moves to the winding rod 630*b* through the downward circulation drive (see FIG. 7) and wounded, when pulling-up drive (see FIG. 10) of the curtain sheet 610 is performed, the tape belt D 28D requires a length that allows the auxiliary pulley 26D2 to additionally rotate. In this regard, the auxiliary pulley 26D2 of the D driving part 300 has a diameter smaller than that of the main pulley 26D1. In the drawing (see FIG. 10), in case of the pulling-up drive of the curtain sheet 610, the number of rotations of the curtain sheet 610 wound around the winding rod 630*b* is obtained, in which the curtain sheet 610 has a length the same as an installation height h of the blind that is wound around the winding rod 630*b* corresponding to the main pulley 26D1, and the curtain sheet 610 needs to be small as a diameter formed by a winding length of the tape belt 28D having the number of rotations the same as that of the curtain sheet 610. The length of the tape belt 28D that is additionally wound around the auxiliary pulley 26D2 having the diameter as described above is secured, such that the pulling-up drive of the curtain sheet 610 is possible in all cases.

MODE FOR INVENTION

The following describes another embodiment of the present invention, and relates to a unidirectional complex clutch including a latch wheel which is a tool for transmitting unidirectional power and a pawl guide groove which guides a movement of the pawl.

Figure 11:
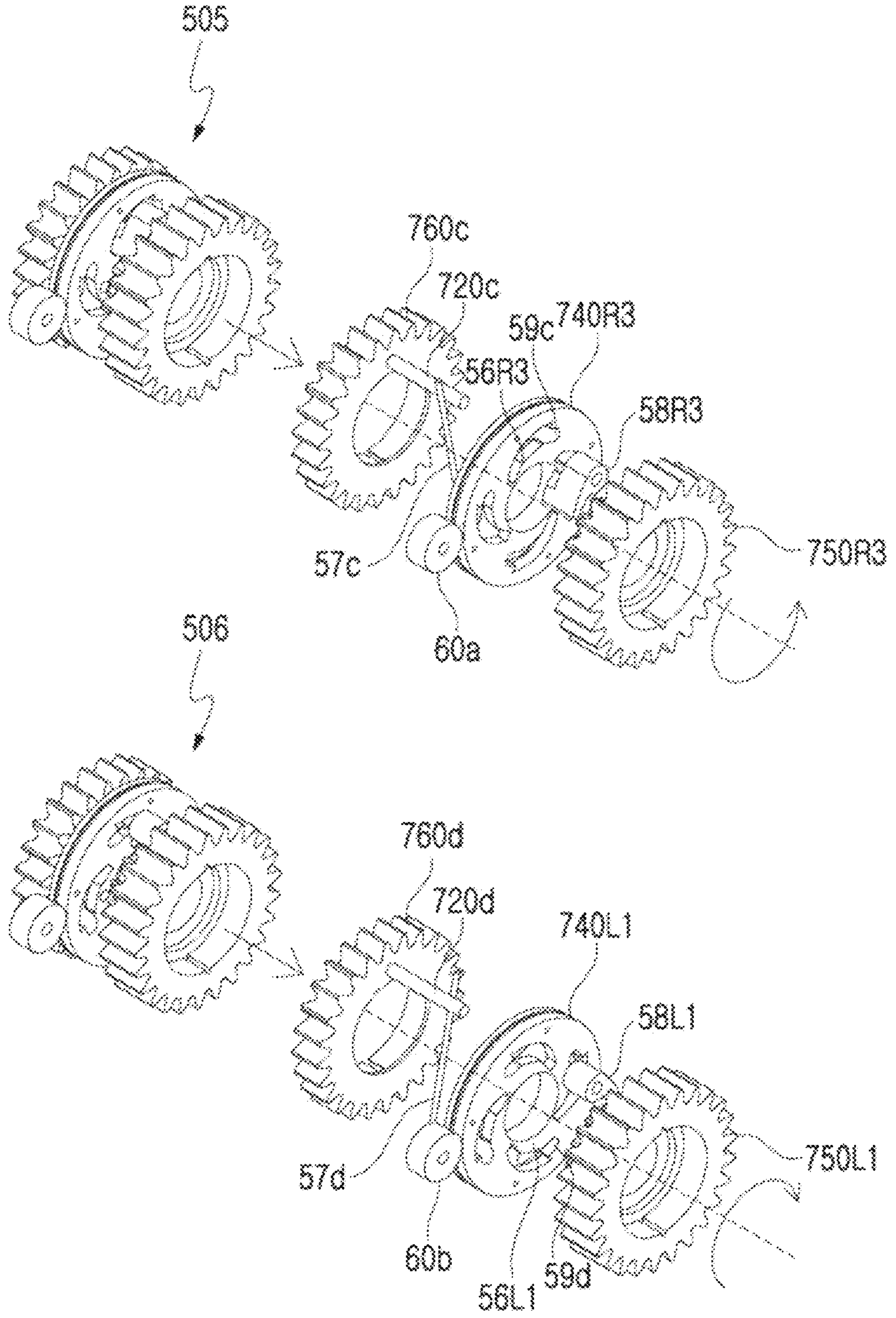
FIG. 11 is a view of a rotation direction configuration of a unidirectional complex clutch.

As shown in the accompanying drawings (see FIGS. 11, 12, and 13), the connection driving part 400 includes: a unidirectional complex clutch R 505 including the center shaft 553 that is installed to idle on the partition plate 130, which is provided inside the bottom surface of the upper plate 110 of the body frame 100 formed with the plurality of shaft holes 150, a latch wheel idle gear 750R3 that is provided with a latch wheel, which idles on one end of the center shaft 553 to transmit clockwise rotation to one side thereof, and transmits the rotation force to the auxiliary pulley secondary gear 512*d* through the engaged connection gear set 230, a pawl shaft fixing idle gear 760*c* that is positioned on an opposite end of the center shaft 553 to receive the rotation force from the main pulley secondary gear 511*b*, and installed with one or more pawl shafts 720*c* each having a pawl 58R3 disposed thereon, in which the pawl 58R3 engages with the latch wheel idle gear 750R3 in a predetermined condition, a pawl shaft guide hole 59*c* that is positioned between the latch wheel idle gear 750R3 and the pawl shaft fixing idle gear 760*c* and through which the pawl shaft 720*c* passes, a pawl guide idle disc 740R3 that is provided with one or more pawl guide grooves 56R3 which make contact with the pawl shaft guide hole 59*c* to control a movement of the pawl 58R3 in a predetermined condition, a return bar spring 57*c* that is fixed to the center shaft 553 to return the pawl shaft 720*c* to a predetermined position of the pawl shaft guide hole 59*c* when there is no rotation load on the pawl shaft 720*c*, and a deceleration roller 60*a* that generates a load based on a rotation speed of the pawl guide idle disc 740R3; and a unidirectional complex clutch L 506 including the center shaft 554 that is installed to idle on the partition plate 130, which is provided inside the bottom surface of the upper plate 110 of the body frame 100 formed with the plurality of shaft holes 150, a latch wheel idle gear 750L1 that is provided with a latch wheel, which idles on one end of the center shaft 554 to transmit counterclockwise rotation to one side thereof, and transmits the rotation force to the main pulley secondary gear 512*b* through the engaged connection gear set 240, a pawl shaft fixing idle gear 760*d* that is positioned on an opposite end of the center shaft 554 to receive the rotation force from the auxiliary pulley secondary gear 511*d*, and installed with one or more pawl shafts 720*d* each having a pawl 58L1 disposed thereon, in which the pawl 58L1 engages with the latch wheel idle gear 750L1 in a predetermined condition, a pawl shaft guide hole 59*d* that is positioned between the latch wheel idle gear 750L1 and the pawl shaft fixing idle gear 760*d* and through which the pawl shaft 720*d* passes, a pawl guide idle disc 740L1 that is provided with one or more pawl guide grooves 56L1 which make contact with the pawl shaft guide hole 59*d* to control a movement of the pawl 58L1 in a predetermined condition, a return bar spring 57*d* that is fixed to the center shaft 554 to return the pawl shaft 720*d* to a predetermined position of the pawl shaft guide hole 59*d* when there is no rotation load on the pawl shaft 720*d*, and a deceleration roller 60*b* that generates a load based on a rotation speed of the pawl guide idle disc 740L1.

Figure 12:
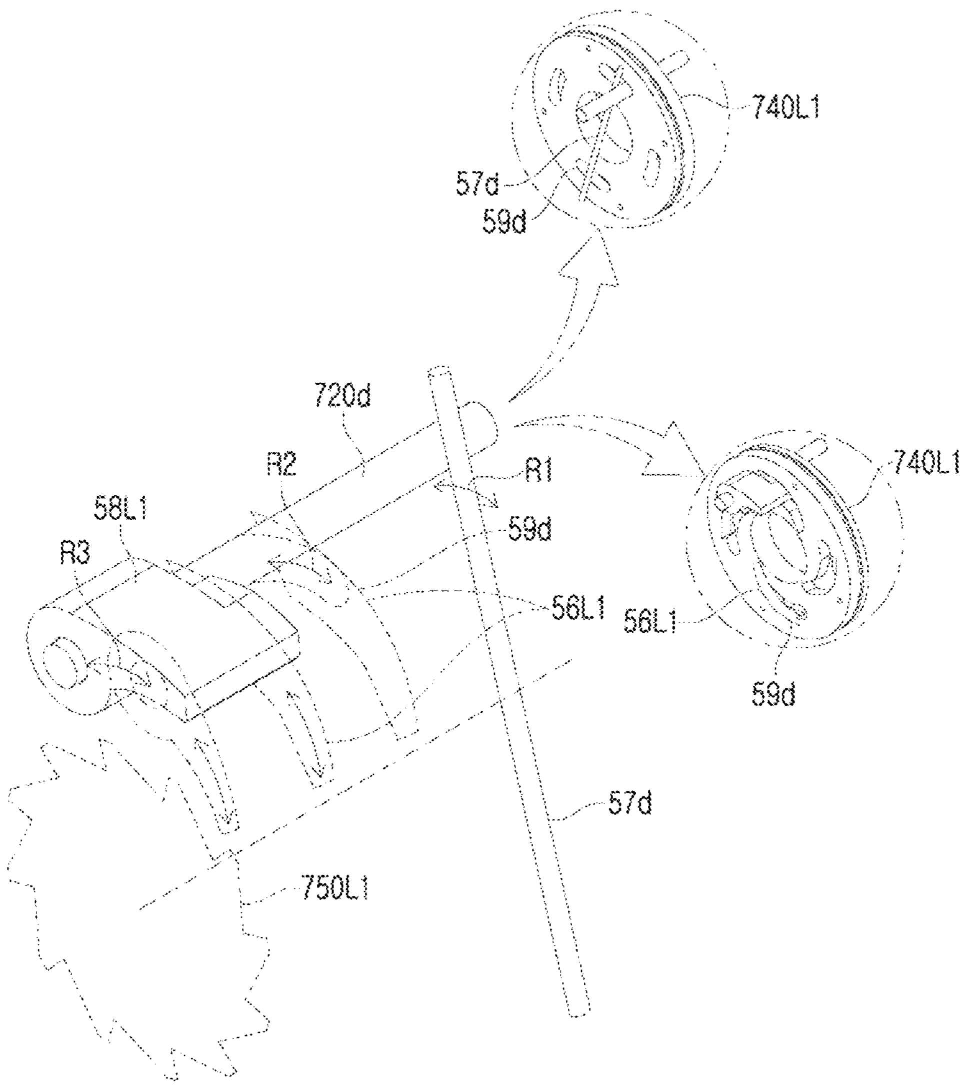
FIG. 12 is an explanatory view of a principle of operations of both surfaces of a pawl guide disc and a unidirectional complex clutch L.
Figure 13:
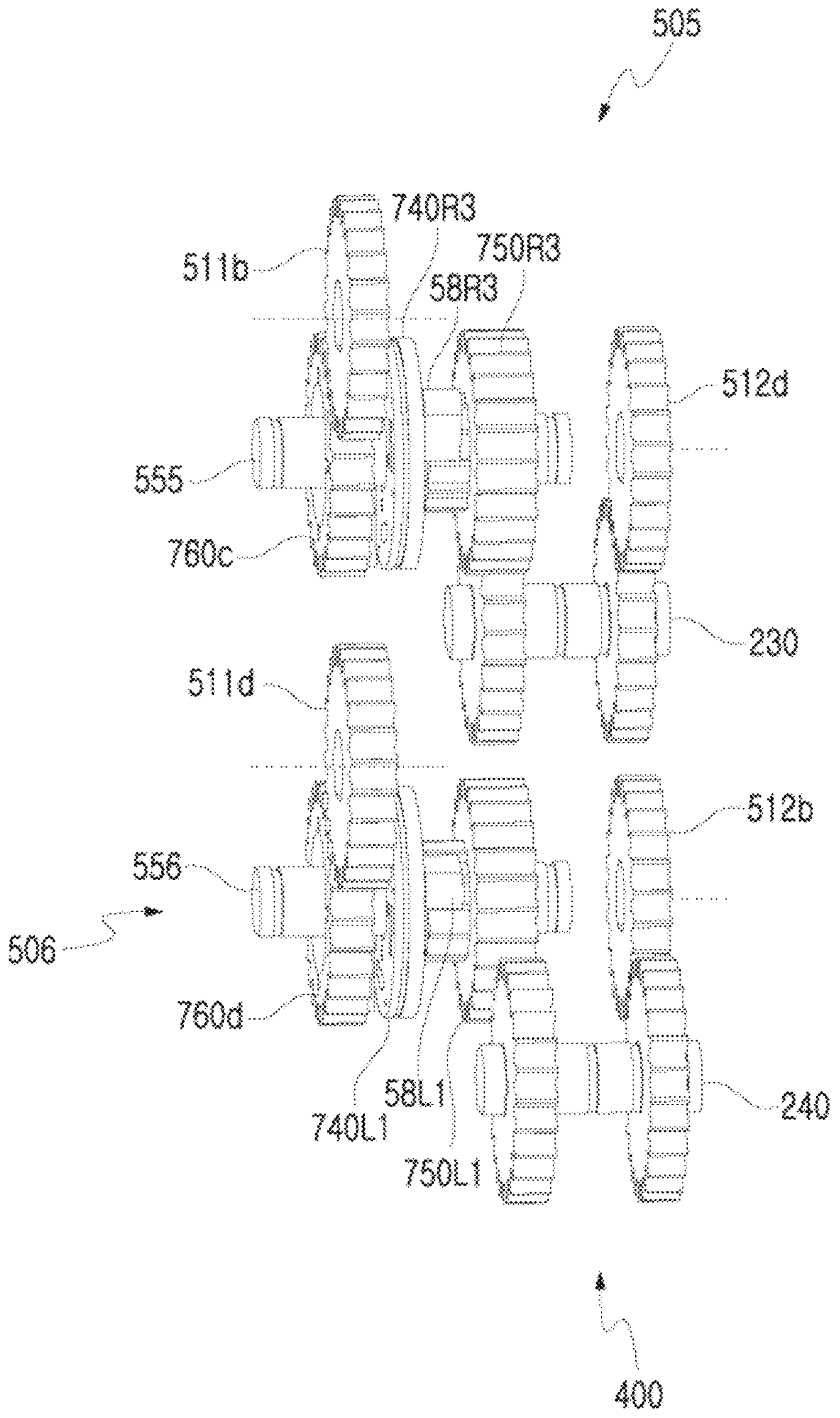
FIG. 13 is a perspective view of a connection driving part including a unidirectional complex clutch.

Since the unidirectional complex clutch R 505 and the unidirectional complex clutch L 506 are designed to operate in opposite directions to each other, a type of the configuration and the principle of the operation are the same, a description of the unidirectional complex clutch L 506 will be described first through the accompanying drawing (see FIG. 12). In the B driving part 200, a counterclockwise rotation force engaging with the auxiliary pulley secondary gear 511*d* and transmitted to the pawl shaft fixing idle gear 760*d* is connected to the latch wheel provided in the latch wheel idle gear 750L1 through the pawl shaft 720*d* and the pawl 58L1, the pawl shaft 720*d* rotating while the pawl shaft fixing idle gear 760*d* rotates moves by a predetermined distance inside the pawl shaft guide hole 59*d* provided in the pawl guide disc 740L1. In this case, the return bar spring 57*d* installed adjacent to the pawl shaft guide hole 59*d* is compressed and moved using a difference in the rotation speed between the pawl guide disc 740L1 and the pawl shaft fixing idle gear 760*d*, which are rotationally decelerated by the deceleration roller 60*b* that generates the load based on the rotation speed of the pawl guide disc 740L1, and when the rotation load of the pawl shaft fixing idle gear 760*d* disappears, a pawl shaft 720*d* is returned to its original position by a force of the return spring 57*d*. Through movements R1, R2, and R3 of the pawl shaft 720*d*, the pawl 58L1 disposed at the end of the pawl shaft 720*d* is moved. Meanwhile, one end of the pawl 58L1 is inserted into the pawl guide groove 56L1 in contact with the pawl shaft guide hole 59*d* provided in the pawl guide disc 740L1, and guided in a direction of the pawl guide groove 56L1 designed toward the latch wheel provided on the latch wheel idle gear 750L1 according to the movements R1, R2, and R3 of the pawl shaft 720*d*. As a result, the pawl 58L1 is coupled to or separated from the latch wheel provided on the latch wheel idle gear 750L1 according to the movements R1, R2, and R3 of the pawl shaft 720*d*, and returned to its original position. Since the same operation process applies to the unidirectional complex clutch R 505 in which only the rotation direction is changed, an additional description thereof will be omitted.

Meanwhile, the rotation force generated in the D driving part 300 reaches the auxiliary pulley secondary gear 512*d* or the auxiliary pulley secondary gear 512*b* and is transmitted to the latch wheel idle gears 750R3 and 750L1 engaged by the connection gear sets 230 and 240. However, currently, there is no rotation load on the pawl shaft fixing idle gears 760*c* and 760*d*, and thus the pawl shaft 720*d* is returned to its original position due to the force of the return rod spring 57*d*, so that the positions of the pawls 58R3 and 58L1 are in a state in which the rotation force is cut off. Therefore, the unidirectional complex clutch R 505 and the unidirectional complex clutch L 506 operate in the same manner as the third rotation direction selection part 503 and the fourth rotation direction selection part 504.

The following describes another embodiment of the present invention, and relates to a bidirectional complex clutch 507 that performs the same operation as the rotation direction selection part 500 having a unidirectional complex clutch in both directions.

As shown in the accompanying drawing (see FIG. 14), a bidirectional complex clutch 507 includes: an idle sprocket 710 that has one or more pawl shaft control grooves 711 and 712 provided on both sides thereof at a position spaced apart from each other in an opposite direction around the center shaft 551 installed to idle on the partition plate 130, which is provided inside the bottom surface of the upper plate 110 of the body frame 100 and formed with the plurality of shaft holes 150; latch wheel idle gears 750R1 and 750R2 that are installed to face a same component based on the idle sprocket 710, are first provided with latch wheels which idle on opposite ends of the center shaft 551 to transmit unidirectional rotation to one side thereof, and transmits a generated rotation force to another shaft; pawl shaft fixing idle gears 730*a* and 730*b* that are positioned on both sides of the idle sprocket 710, and installed with one or more pawl shafts 720*a* and 720*b* having pawls 58R1 and 58R2 disposed thereon, in which the pawls 58R1 and 58R2 are inserted into the pawl shaft control grooves 711 and 712 to receive the rotation force and engage with the latch wheel idle gears 750R1 and 750R2 in a predetermined condition; pawl shaft guide holes 59*a* and 59*b* that are positioned between the latch wheel idle gears 750R1 and 750R2 and the pawl shaft fixing idle gears 730*a* and 730*b*, respectively and through which the pawl shafts 720*a* and 720*b* pass; pawl guide idle discs 740R1 and 740R2 that are provided with one or more pawl guide grooves 56R1 and 56R2 which make contact with the pawl shaft guide holes 59*a* and 59*b* to control a movement of the pawls 58R1 and 58R2 in a predetermined condition; and return bar springs 57*a* and 57*b* that are installed on the center shaft 551 to return the pawl shafts 720*a* and 720*b* to a predetermined position of the pawl shaft guide holes 59*a* and 59*b* when there is no rotation load on the pawl shafts 720*a* and 720*b*.

Figure 14:
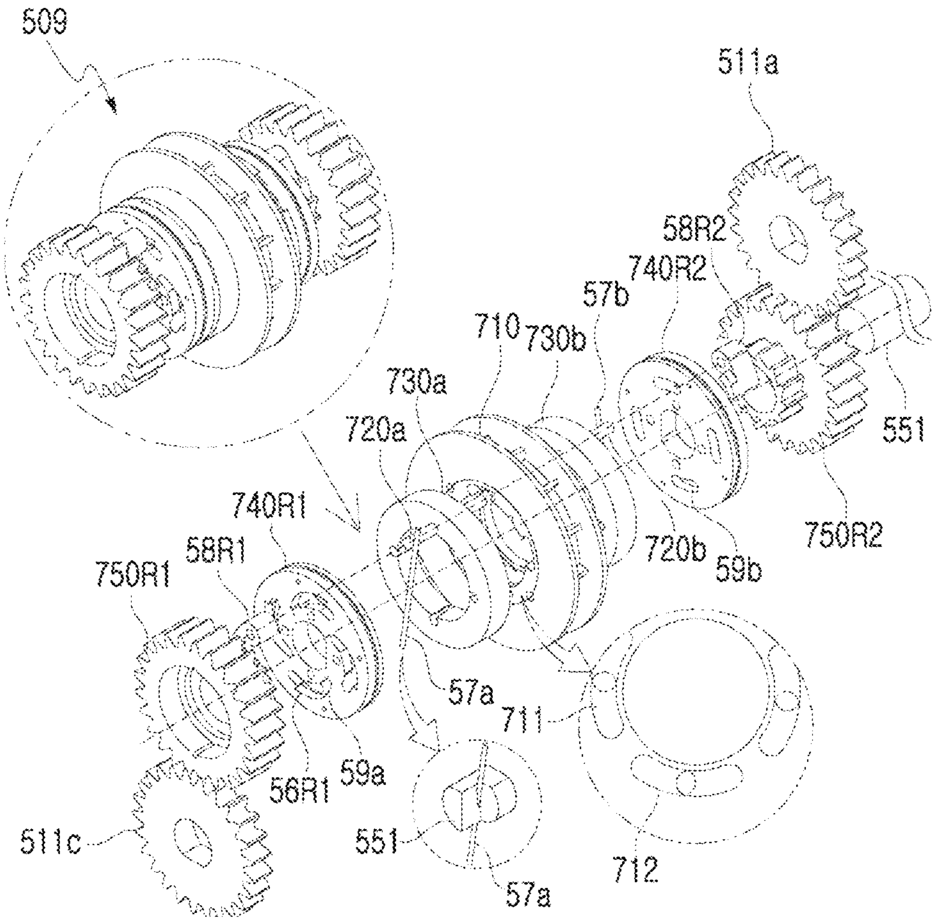
FIG. 14 is a perspective view for explaining a bidirectional complex clutch.

Although the bidirectional complex clutch 507 has the same principle (see FIG. 12) as the unidirectional complex clutches 505 and 506 according to the rotation direction, there is a slight difference in the configuration in which the bidirectional complex clutch 507 operates on the same shaft, whereas the unidirectional complex clutches 505 and 506 operate on each shaft, and this will be described through the accompanying drawing (see FIG. 14).

In the idle sprocket 710 located at the center of the bidirectional complex clutch 507, one or more pawl shaft control grooves 711 and 712 are provided in both sides thereof at a position spaced apart from each other in an opposite direction by a distance between the movements R1, R2, and R3 of the pawl shaft. This means that when the idle sprocket 710 rotates in one direction (first, on the assumption of counterclockwise rotation: affect on the configuration on the left side in the accompanying drawing (see FIG. 14)), one end of the pawl shaft 720*a* in the corresponding direction fixed to the pawl shaft idle disc 730*a* is inserted into the pawl shaft control groove 711, and thus the idle sprocket 710 and the pawl shaft idle disc 730*a* are activated together, and in this case, while the pawl 58R1 arranged on the other end of the pawl shaft 720*a* moves to a point where it is coupled to the latch wheel of the latch wheel idle gear 750R1, the opposite pawl shaft 720*b* does not need to be activated. That is, the opposite pawl shaft 720*b* is not activated by arranging a gap corresponding to a movement distance of the pawl shaft 720*a* in the opposite pawl shaft control groove 712. This is because when the opposite pawl shaft 720*b* is activated before the pawl 58R1 arranged on the end of the pawl shaft 720*a* reaches the point where it is coupled to the latch wheel of the latch wheel idle gear 750R1, the pawl guide disc 740R2 fixed to the center shaft 551 rotates, thereby preventing first intended engagement of the pawl 58R1 and the latch wheel of the latch wheel idle gear 750R1. Since the same operation process is applied even when it is assumed that the idle sprocket 710 rotates in a clockwise rotation (affect on the configuration on the right side of the accompanying drawing (see FIG. 14)), a description thereof will be omitted.

As described above, the idle sprocket 710 rotates in a state in which after the rotation force of the idle sprocket 710 located at the center of the bidirectional complex clutch 507 is connected to one of the latch wheel idle gears 750R1 and 750R2, the rotation force on the other side is not coupled, such that the desired purpose of the operation is achieved and the same operation as the rotation direction selection parts 501 and 502 is performed.

The following describes another embodiment of the present invention, and the unidirectional complex clutch R 505 and the unidirectional complex clutch L 506 are simultaneously connected to the auxiliary pulley secondary gear 511*d* of the B driving part 200 and the main pulley secondary gear 512*b* of the D driving part 300, such that it is possible to shorten a power transmission path and simplify the configuration.

Figure 15:
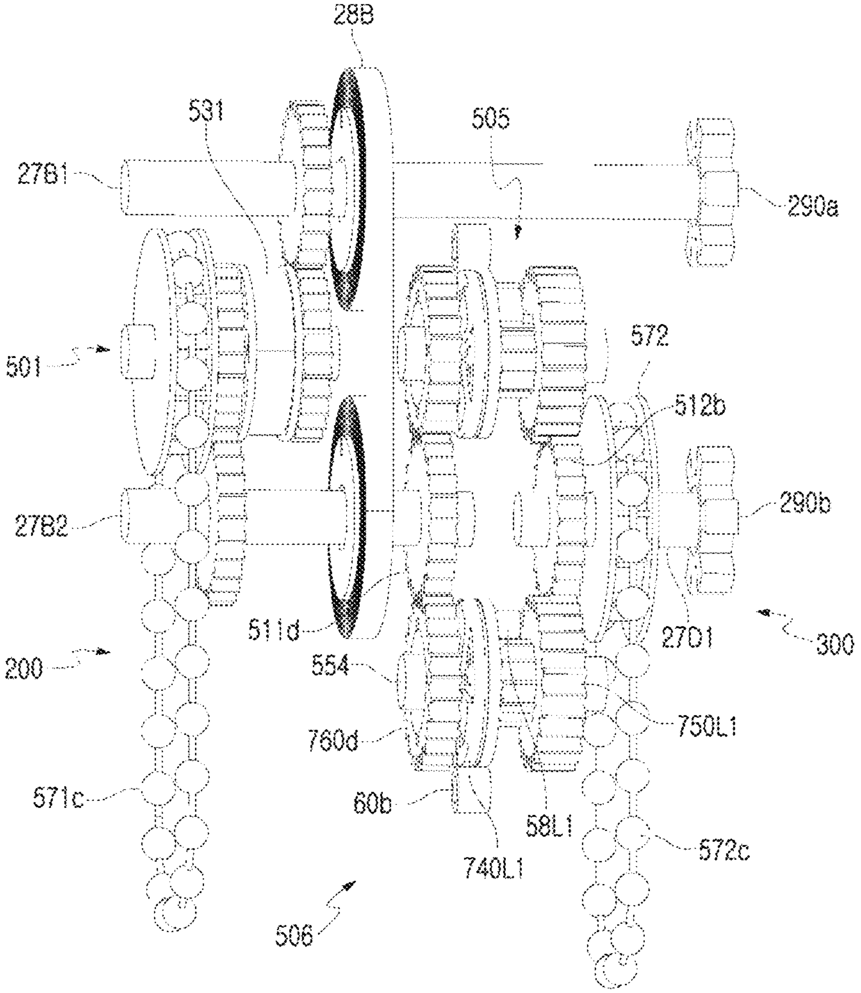
FIG. 15 is a view in which unidirectional complex clutches R and L are simultaneously connected to one shaft of the connection driving part.

As shown in the accompanying drawing (see FIG. 15), there is provided a dual blind curtain including: a body frame 100 including an upper plate 110 that forms an upper surface, side plates 120 that are provided on both sides of a bottom surface of the upper plate 110 and formed with a plurality of shaft holes 150, and one or more partition plates 130 that are provided inside the bottom surface of the upper plate 110 and formed with a plurality of shaft holes 150;

a B driving part 200 comprising: a first rotation direction selection part 501 including a center shaft 551 that is installed to idle on the partition plate 130, which is provided inside the bottom surface of the upper plate 110 of the body frame 100 and formed with the plurality of shaft holes 150, and provided on an outer circumferential surface thereof with a locking protrusion 55-1, a center sprocket 571 that is installed on one side of the center shaft 551 and provided with a ball chain 571*c* to generate a rotation force, a second idle gear clutch 521*b* that is installed to idle around the center shaft 551, provided with a unidirectional connection port 52-*b* in one side thereof, and engaged with a main pulley primary gear 511*a*, a first idle gear clutch 521*a* that idles on the center shaft 551, is provided with a unidirectional connection port 52-*a* in one side thereof to face the second idle gear clutch 521*b* at a predetermined interval, and engages with an auxiliary pulley primary gear 511*c*, a center nut 531 that is positioned between the first and second idle gear clutches 521*a* and 521*b*, provided on an inner surface of a body thereof with a nut groove 53-1, and installed so that the body idles at the shaft hole 150 of the partition plate 130, and a center bolt 541 that rotates in an inner portion of the center nut 531, has a sliding hole 54-2 formed in a center of a body thereof to move left and right of the locking protrusion 55-1, is provided with unidirectional connection ports 54-*a* and 54-*b* on both sides of a bolt body 54-1, respectively, and is provided with a bolt thread 54-3 on an outer circumferential surface of the bolt body 54-1;

a main pulley shaft 27B1 that is installed to idle on the partition plate 130, which is provided inside the bottom surface of the upper plate 110 of the body frame 100 and formed with the plurality of holes 150; a main pulley 26B1 that is constantly coupled to the main pulley shaft 27B1 and rotates; the main pulley primary gear 511*a* that engages with the second idle gear clutch 521*b* of the first rotation direction selection part 501 to transmit the rotation force to the main pulley 26B1; a winding rod connection port 290*a* that connects the rotation force generated in the main pulley 26B1 to a winding rod 630*a;* an auxiliary pulley 26B2 that is constantly coupled to an auxiliary pulley shaft 27B2 and rotates, in which the auxiliary pulley 26B2 is installed to idle on the partition plate 130, which is provided inside the bottom surface of the upper plate 110 of the body frame 100 and formed with the plurality of shaft holes 150; an auxiliary pulley primary gear 511*c* that engages with the first idle gear clutch 521*a* of the first rotation direction selection part 501 to transmit the rotation force to the auxiliary pulley 26B2; an auxiliary pulley secondary gear 511*d* that engages with pawl shaft fixing idle gears 760*c*, 760*d* of a connection driving part 400 and transmits the rotation force transmitted to the auxiliary pulley 26B2; and a tape belt B 28B that connects the rotation force of the main pulley 26B1 or the rotation force of the auxiliary pulley 26B2 to each other and is connected to central axes of the main pulley 26B1 and the auxiliary pulley 26B2 to be wound in a stacked manner;

a D driving part 300 including: a main pulley shaft 27D1 that is installed to idle on the partition plate 130, which is provided inside the bottom surface of the upper plate 110 of the body frame 100 and formed with the plurality of holes 150; a main pulley secondary gear 512*b* that is installed on one end of the main pulley shaft 27D1 and connected to latch wheel idle gears 750R3 and 750L1 of the connection driving part 400; a center sprocket 572 that is installed on the main pulley shaft 27D1 and provided with a ball chain 572*c* to generate the rotation force; and a winding rod connection port 290*b* connects the rotation force generated in the main pulley shaft 27D1 to a winding rod 630*b;* the connection driving part 400 comprising: a unidirectional complex clutch R 505 including a latch wheel idle gear 750R3 that is provided with a latch wheel, which idles on one end of a center shaft 553 to transmit clockwise rotation to one side thereof, and engaged with the main pulley secondary gear 512*b* to transmit the rotation force, in which the center shaft 553 is installed to idle on the partition plate 130, which is provided inside the bottom surface of the upper plate 110 of the body frame 100 and formed with the plurality of shaft holes 150, a pawl shaft fixing idle gear 760*c* that is positioned on an opposite end of the center shaft 553 to receive the rotation force from the auxiliary pulley secondary gear 511*d*, and installed with one or more pawl shafts 720*c* each having a pawl 58R3 disposed thereon, in which the pawl 58R3 engages with the latch wheel idle gear 750R3 in a predetermined condition, a pawl shaft guide hole 59*c* that is positioned between the latch wheel idle gear 750R3 and the pawl shaft fixing idle gear 760*c* and through which the pawl shaft 720*c* passes, a pawl guide idle disc 740R3 that is provided with one or more pawl guide grooves 56R3 which make contact with the pawl shaft guide hole 59*c* to control a movement of the pawl 58R3 in a predetermined condition, a return bar spring 57*c* that is fixed to the center shaft 553 to return the pawl shaft 720*c* to a predetermined position of the pawl shaft guide hole 59*c* when there is no rotation load on the pawl shaft 720*c*, and a deceleration roller 60*a* that generates a load based on a rotation speed of the pawl guide idle disc 740R3; and the unidirectional complex clutch L 506 including a latch wheel idle gear 750L1 that is provided with a latch wheel, which idles on one end of a center shaft 554 to transmit counterclockwise rotation to one side thereof, and engaged with the main pulley secondary gear 512*b* to transmit the rotation force, in which the center shaft 554 is installed to idle on the partition plate 130, which is provided inside the bottom surface of the upper plate 110 of the body frame 100 and formed with the plurality of shaft holes 150, a pawl shaft fixing idle gear 760*d* that is positioned on an opposite end of the center shaft 554 to receive the rotation force from the auxiliary pulley secondary gear 511*d*, and installed with one or more pawl shafts 720*d* each having a pawl 58L1 disposed thereon, in which the pawl 58L1 engages with the latch wheel idle gear 750L1 in a predetermined condition, a pawl shaft guide hole 59*d* that is positioned between the latch wheel idle gear 750L1 and the pawl shaft fixing idle gear 760*d* and through which the pawl shaft 720*d* passes, a pawl guide idle disc 740L1 that is provided with one or more pawl guide grooves 56L1 which make contact with the pawl shaft guide hole 59*d* to control a movement of the pawl 58L1 in a predetermined condition, a return bar spring 57*d* that is fixed to the center shaft 554 to return the pawl shaft 720*d* to a predetermined position of the pawl shaft guide hole 59*d* when there is no rotation load on the pawl shaft 720*d*, and a deceleration roller 60*b* that generates a load based on a rotation speed of the pawl guide idle disc 740L1; and a curtain part 600 installed to idle on the side plate 120 and the partition plate 130, which is provided inside the bottom surface of the upper plate 110 of the body frame 100 and formed with the plurality of shaft holes 150, and including a curtain sheet 610 that is made by connecting one or more various pattern sheets and has one end wound around the winding rod 630*a* connected by the winding rod connection ports 290*a* and 290*b* and an opposite end wound around another winding rod 630*b* by the rotation force of the main pulley shafts 27B1 and 27D1, and a weight bar 620 that is formed on a center of the curtain sheet 610 wound around opposite ends thereof.

In the above configuration, as briefly described above, the unidirectional complex clutch R 505 and the unidirectional complex clutch L 506 are simultaneously connected to the auxiliary pulley secondary gear 511*d* of the B driving part 200 and the main pulley secondary gear 512*b* of the D driving part 300, and in more detail, the pawl shaft fixing idle gears 760*c* and 760*d* idle on individual shafts and simultaneously connected to the auxiliary pulley secondary gear 511*d* of the B driving part 200. Thus, it generates a rotation force that is always in the same direction without interfering with mutual rotation, and the rotation force is transmitted to the main pulley secondary gear 512*b* by using only one of couplings (the pawl 58R3 and the latch wheel idle gear 750R3 or the pawl 58L1 and the latch wheel idle gear 750L1) formed by the pawl guide discs 740R3 and 740L1 provided on the individual center shafts 553 and 554.

Therefore, the initial rotation force generated by the center sprocket 571 reaches the winding rod connection ports 290*a* and 290*b* of the both shafts 27B1 and 27B2 through the tape belt B 28B and is transmitted to the winding rods 630*a* and 630*b*, such that the rotation force enables circulation drive of the curtain part 600. Meanwhile, the rotation of the center sprocket 572 provided on the main pulley shaft 27D1 enables vertical drive of the curtain part 600, in this case, the rotation force of the center sprocket 572 is not transmitted to the latch wheel idle gears 750R3 and 750L1 because there is no load on the B driving part 200.

Through such a configuration, it is possible to shorten a power transmission path and simplify the configuration.

The following describes another embodiment of the present invention, and in the present invention (see FIG. 15), applying the unidirectional complex clutch R 505 and the unidirectional complex clutch L 506 to the connection driving part 400 is changed for the purpose of replacing the first rotation direction selection part 501 of the B driving part 200, and the D driving part 300 in charge of vertical drive of the curtain is eliminated to have only a function for a circular motion of the dual blind curtain.

Figure 16:
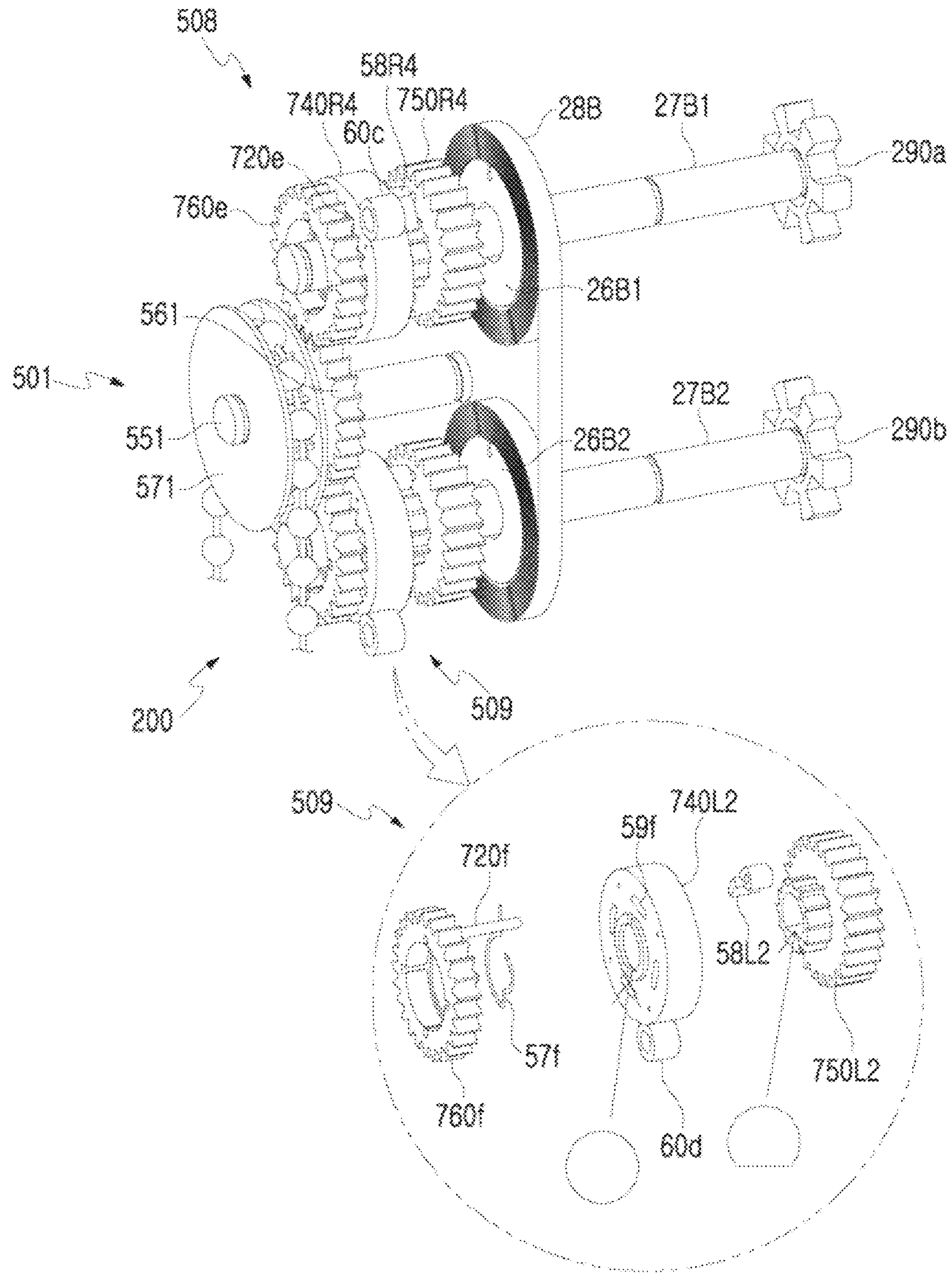
FIG. 16 is a view in which the unidirectional complex clutches R and L are applied to the rotation direction selection part.

As shown in the accompanying drawing (see FIG. 16), there is provided a dual blind curtain including: a body frame 100 including an upper plate 110 that forms an upper surface, side plates 120 that are provided on both sides of a bottom surface of the upper plate 110 and formed with a plurality of shaft holes 150, and one or more partition plates 130 that are provided inside the bottom surface of the upper plate 110 and formed with a plurality of shaft holes 150;

a B driving part 200 comprising: a first rotation direction selection part 501 including a unidirectional complex clutch L2 509 which includes a center shaft 551 that is installed to idle on the partition plate 130, which is provided inside the upper plate 110 of the body frame 100 and formed with the plurality of shaft holes 150, a center sprocket 571 that is installed on one side of the center shaft 551 and provided with a ball chain 571*c* to generate a rotation force, a center gear 561 that transmits the rotation force of the center sprocket 571 to pawl shaft fixing idle gears 760*e* and 760*f* of the unidirectional complex clutch R2 508 and the unidirectional complex clutch L2 509, respectively, a latch wheel fixing rotation gear 750L2 that is provided with a latch wheel, which is installed on one end of the auxiliary pulley shaft 27B2 to transmit counterclockwise rotation to one side thereof, in which the auxiliary pulley shaft 27B2 is installed to idle on the partition plate 130, which is provided on the inner side of the bottom surface of the upper plate 110 of the body frame 100 and formed with the plurality of shaft holes 150, a pawl shaft fixing idle gear 760*f* that is positioned on an opposite end of the auxiliary pulley shaft 27B2 to receive the rotation force from the center gear 561, and installed with one or more pawl shafts 720*f* each having a pawl 58L2 disposed thereon, in which the pawl 58L2 engages with the latch wheel fixing rotation gear 750L2 in a predetermined condition, a pawl shaft guide hole 59*f* that is positioned between the latch wheel fixing rotation gear 750L2 and the pawl shaft fixing idle gear 760*f* and through which the pawl shaft 720*f* passes, a pawl guide idle disc 740L2 that is provided with one or more pawl guide grooves 56L2 which make contact with the pawl shaft guide hole 59*f* to control a movement of the pawl 58L2 in a predetermined condition, a return circular spring 57*f* that is installed on one side of the pawl guide idle disc 740L2 to idle with respect to a shaft to return the pawl shaft 720*f* to a predetermined position of the pawl shaft guide hole 59*f* when there is no rotation load on the pawl shaft 720*f*, and a deceleration roller 60*d* that generates a load based on a rotation speed of the pawl guide idle disc 740L2, and the complex clutch R2 508 which includes a latch wheel fixing rotation gear 750R4 that is provided with a latch wheel provided on one end of the main pulley shaft 27B1 to transmit clockwise rotation to one side thereof, and transmits the rotation force to a shaft, in which the main pulley shaft 27B1 is installed to idle on the partition plate 130, which is provided inside the bottom surface of the upper plate 110 of the body frame 100 has and formed with the plurality of shaft holes 150, a pawl shaft fixing idle gear 760*e* that is positioned on an opposite end of the main pulley shaft 27B1 to receive the rotation force from the center gear 561, and installed with one or more pawl shafts 720*e* each having a pawl 58R4 disposed thereon, in which the pawl 58R4 engages with the latch wheel fixing rotation gear 750R4 in a predetermined condition, a pawl shaft guide hole 59*e* that is positioned between the latch wheel fixing rotation gear 750R4 and the pawl shaft fixing idle gear 760*e* and through which the pawl shaft 720*e* passes, a pawl guide idle disc 740R4 that is provided with one or more pawl guide grooves 56R4 which make contact with the pawl shaft guide hole 59*e* to control a movement of the pawl 58R4 in a predetermined condition, a return circular spring 57*e* that is installed on one side of the pawl guide idle disc 740R4 to idle with respect to a shaft to return the pawl shaft 720*e* to a predetermined position of the pawl shaft guide hole 59*e* when there is no rotation load on the pawl shaft 720*e*, and a deceleration roller 60*c* that generates a load based on a rotation speed of the pawl guide idle disc 740R4;

a main pulley 26B1 that is constantly coupled to the main pulley shaft 27B1 and rotates; a winding rod connection port 290*a* that connects the rotation force generated in the main pulley 26B1 to a winding rod 630*a;* an auxiliary pulley 26B2 that is constantly coupled to the auxiliary pulley shaft 27B2 and rotates; a winding rod connection port 290*b* that connects the rotation force transmitted to the auxiliary pulley 26B2 to a winding rod 630*b*; and a tape belt B 28B that connects the rotation force of the main pulley 26B1 or the rotation force of the auxiliary pulley 26B2 to each other and is connected to central axes of the main pulley 26B1 and the auxiliary pulley 26B2 to be wound in a stacked manner; and a curtain part 600 installed to idle on the side plate 120 and the partition plate 130, which is provided inside the bottom surface of the upper plate 110 of the body frame 100 and formed with the plurality of shaft holes 150, and including a curtain sheet 610 that is made by connecting one or more various pattern sheets and has one end wound around the winding rod 630*a* connected by the winding rod connection ports 290*a* and 290*b* and an opposite end wound around another winding rod 630*b* by the rotation force of the main pulley shafts 27B1 and 27D1, and a weight bar 620 that is formed on a center of the curtain sheet 610 wound around opposite ends thereof.

Describing the invention in detail, a configuration in which the unidirectional complex clutch R 505 and the unidirectional complex clutch L 506 are applied to the connection driving part 400 is changed for the purpose of replacing the first rotation direction selection part 501 and diverted to the unidirectional complex clutch R2 508 and the unidirectional complex clutch L2 509. Since there is no change in the basic configuration and principle of the operation as compared with the above-described drawings (see FIG. 11: a view of a rotation direction configuration of the unidirectional complex clutch, FIG. 12: an operation principle of both sides of the pawl guide disc and unidirectional complex clutch L), a detailed description thereof will be omitted.

However, as a part that serves to transmit the rotation force generated by organic coupling of the component is changed, a method for coupling the shaft of the part is changed to fixing or idling, and a change in a shape of the return spring accordingly will be described in more detail.

That is, the pawl guide discs 740R1, 740R2, 740R3, and 740L1 are fixedly installed to the connection driving part 400 to transmit the rotation force to the shafts, and accordingly, the return bar springs 57*a*, 57*b*, 57*d*, and 57*d* are also fixedly installed to the shafts.

In contrast, when applied to the first rotation direction selection part 501, the pawl guide discs 740R1, 740R2, 740R3, and 740L1 are installed to idle on the shafts to have shapes of the pawl guide idle discs 740R4 and 740L2, and accordingly, as the springs, the return circular springs 57*e* and 57*f* are installed to idle with respect to the shaft rotation. In addition, as parts for transmitting the rotation force to the shaft, the latch wheel idle gears 750R1, 750R2, 750R3, and 750L1, which are installed to idle on the connection driving part 400, are installed by changing a shape of the shaft coupling into the latch wheel fixing rotation gears 750R4 and 750L2 which are fixedly installed on the shafts.

As will be additionally described herein, even if the pawl guide discs 740R1, 740R2, 740R3, and 740L1 are not fixedly installed to transmit the rotation force on the shafts and installed to idle when applied to the connection driving part 400, they are only responsible for a power connection function, so that it is cleared that there is no problem in the basic operation principle of the invention.

INDUSTRIAL APPLICABILITY

The present invention is a technology that is applicable to a roll blind for a curtain, as well as to transmission of power when the rotation ratio of the two shafts is not constant, but changed, selective transmission of rotation power from one shaft to the two shafts, and connection of power of the two shafts having different rotation directions from each other such that only unidirectional power transmission is possible from one shaft to the other shaft.

The invention claimed is:

1. A dual blind curtain comprising:

a body frame (100) including an upper plate (110) that forms an upper surface, side plates (120) that are provided on both sides of a bottom surface of the upper plate (110) and formed with a plurality of shaft holes (150), and one or more partition plates (130) that are provided inside the bottom surface of the upper plate (110) and formed with a plurality of shaft holes (150);

a B driving part (200) comprising: a first rotation direction selection part (501) including a center shaft (551) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center sprocket (571) that is installed on one side of the center shaft (551) and provided with a ball chain (571*c*) to generate a rotation force, a second idle gear clutch (521*b*) that is installed to idle around the center shaft (551), provided with a unidirectional connection port (52-*b*) in one side thereof, and engaged with a main pulley primary gear (511*a*), a first idle gear clutch (521*a*) that idles on the center shaft (551), is provided with a unidirectional connection port (52-*a*) in one side thereof to face the second idle gear clutch (521*b*) at a predetermined interval, and engages with an auxiliary pulley primary gear (511*c*), a center nut (531) that is positioned between the first and second idle gear clutches (521*a* and 521*b*), provided on an inner surface of a body thereof with a nut groove (53-1), and installed so that the body idles at the shaft hole (150) of the partition plate (130), and a center bolt (541) that rotates in an inner portion of the center nut (531), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1); a main pulley shaft (27B1) that is installed to idle on the partition plate (130), which is provided inside the bottom surface of the upper plate (110) of the body frame (100) and formed with the plurality of holes (150); a main pulley (26B1) that is constantly coupled to the main pulley shaft (27B1) and rotates; the main pulley primary gear (511*a*) that engages with the second idle gear clutch (521*b*) of the first rotation direction selection part (501) to transmit the rotation force to the main pulley (26B1); a main pulley secondary gear (511*b*) that engages with a center gear (563) of a connection driving part (400) and transmits the rotation force transmitted to the main pulley (26B1); a winding rod connection port (290*a*) that connects the rotation force generated in the main pulley (26B1) to a winding rod (630*a*); an auxiliary pulley (26B2) that is constantly coupled to an auxiliary pulley shaft (27B2) and rotates, in which the auxiliary pulley (26B2) is installed to idle on the partition plate (130), which is provided inside the bottom surface of the upper plate (110) of the body frame (100) and formed with the plurality of shaft holes (150); an auxiliary pulley primary gear (511*c*) that engages with the first idle gear clutch (521*a*) of the first rotation direction selection part (501) to transmit the rotation force to the auxiliary pulley (26B2); an auxiliary pulley secondary gear (511*d*) that engages with a center gear (564) of the connection driving part (400) and transmits the rotation force transmitted to the auxiliary pulley (26B2); and a tape belt B (28B) that connects the rotation force of the main pulley (26B1) or the rotation force of the auxiliary pulley (26B2) to each other and is connected to central axes of the main pulley (26B1) and the auxiliary pulley (26B2) to be wound in a stacked manner; a D driving part (300) comprising: a second rotation direction selection part (502) including a center shaft (552) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center sprocket (572) that is installed on one side of the center shaft (552) and provided with a ball chain (572*c*) to generate a rotation force, a first idle gear clutch (522*a*) that is installed to idle around the center shaft (552), provided with a unidirectional connection port (52-*a*) in one side thereof, and engaged with a main pulley primary gear (512*a*), a second idle gear clutch (522*b*) that idles on the center shaft (552), is provided with a unidirectional connection port (52-*b*) in one side thereof to face the first idle gear clutch (522*a*) at a predetermined interval, and engages with an auxiliary pulley primary gear (512*c*), a center nut (532) that is positioned between the first and second idle gear clutches (522*a*, 522*b*), provided on an inner surface of a body thereof with a nut groove (53-1), and installed so that the body idles at the shaft hole (150) of the partition plate (130), and a center bolt (542) that rotates in an inner portion of the center nut (532), has a sliding hole (54-2) formed in a center of a body thereof to move left and right of the locking protrusion (55-1), is provided with unidirectional connection ports (54-*a* and 54-*b*) on both sides of the bolt body (54-1), respectively, and is provided with a bolt thread (54-3) on an outer circumferential surface of the bolt body (54-1); a main pulley shaft (27D1) that is installed to idle on the partition plate (130), which is provided inside the bottom surface of the upper plate (110) of the body frame (100) and formed with the plurality of holes (150); a main pulley (26D1) that is constantly coupled to the main pulley shaft (27D1) and rotates; a main pulley primary gear (512*a*) that engages with the first idle gear clutch (522*a*) of the second rotation direction selection part (502) to transmit the rotation force to the main pulley (26D1); a main pulley secondary gear (512*b*) that engages with a connection gear set (240) of the connection driving part (400) and transmits the rotation force transmitted to the main pulley (26D1); a winding rod connection port (290*b*) that connects the rotation force generated in the main pulley (27D1) to a winding rod (630*b*); an auxiliary pulley (26D2) that is constantly coupled to an auxiliary pulley shaft (27D2) and rotates, in which the auxiliary pulley (26D2) is installed to idle on the partition plate (130), which is provided inside the bottom surface of the upper plate (110) of the body frame (100) and formed with the plurality of shaft holes (150); an auxiliary pulley primary gear (512*c*) that engages with the second idle gear clutch (522*b*) of the second rotation direction selection part (502) to transmit the rotation force to the auxiliary pulley (26D2); an auxiliary pulley secondary gear (512*d*) that engages with a connection gear set (230) of the connection driving part (400) and transmits the rotation force transmitted to the auxiliary pulley (26D2); and a tape belt D (28D) that connects the rotation force of the main pulley (26D1) or the rotation force of the auxiliary pulley (26D2) to each other and is connected to central axes of the main pulley (26D1) and the auxiliary pulley (26D2) to be wound in a stacked manner; the connection driving part (400) comprising: a third rotation direction selection part (503) including a center shaft (553) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center gear (563) that is installed on one side of the center shaft (553) and engaged with the main pulley secondary gear (511*b*) of the B driving part (200) to receive the rotation force, a first idle gear clutch (523*a*) that is installed to idle around the center shaft (553) and provided with a unidirectional connection port (52-*a*) in one side thereof, a second idle gear clutch (523*b*) that idles on the center shaft (553) and is provided with a unidirectional connection port (52-*b*) in one side thereof to face the first idle gear clutch (523*a*) at a predetermined interval, a center nut (533) that is positioned between the first and second idle gear clutches (523*a* and 523*b*), provided on an inner surface of a body thereof with a nut groove (53-1), and installed so that the body idles at the shaft hole (150) of the partition plate (130), a center bolt (543) that rotates in an inner portion of the center nut (533), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1), and the connection gear set (230) that engages with the auxiliary pulley secondary gear (512*d*) and transmits the rotation force of the second idle gear clutch (523*b*) to the auxiliary pulley secondary gear (512*d*); and the fourth rotation direction selection part (504) including a center shaft (554) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center gear (564) that is installed on one side of the center shaft (554) and engaged with the auxiliary pulley secondary gear (511*d*) of the B driving part (200) to receive the rotation force, a first idle gear clutch (524*a*) that is installed to idle around the center shaft (554) and provided with a unidirectional connection port (52-*a*) in one side thereof, a second idle gear clutch (524*b*) that idles on the center shaft (553) and is provided with a unidirectional connection port (52-*b*) in one side thereof to face the first idle gear clutch (524*a*) at a predetermined interval, a center nut (533) that is positioned between the first and second idle gear clutches (524*a* and 524*b*), provided on an inner surface of a body thereof with a nut groove (53-1), and installed so that the body idles at the shaft hole (150) of the partition plate (130), a center bolt (543) that rotates in an inner portion of the center nut (533), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1), and the connection gear set (240) that engages with the main pulley secondary gear (512*b*) and transmits the rotation force of the first idle gear clutch (524*a*) to the main pulley secondary gear (512*b*); and a curtain part (600) installed to idle on the side plate (120) and the partition plate (130), which is provided inside the bottom surface of the upper plate (110) of the body frame (100) and formed with the plurality of shaft holes (150), and including a curtain sheet (610) that is made by connecting one or more various pattern sheets and has one end wound around the winding rod (630*a*) connected by the winding rod connection ports (290*a* and 290*b*) and an opposite end wound around another winding rod (630*b*) by the rotation force of the main pulley shafts (27B1 and 27D1), and a weight bar (620) that is formed on a center of the curtain sheet (610) wound around opposite ends thereof.

2. The dual blind curtain of claim 1, wherein the connection driving part (400) comprises:

a unidirectional complex clutch R (505) including the center shaft (553) that is installed to idle on the partition plate (130), which is provided inside the bottom surface of the upper plate (110) of the body frame (100) formed with the plurality of shaft holes (150), a latch wheel idle gear (750R3) that is provided with a latch wheel, which idles on one end of the center shaft (553) to transmit clockwise rotation to one side thereof, and transmits the rotation force to the auxiliary pulley secondary gear (512*d*) through the engaged connection gear set (230), a pawl shaft fixing idle gear (760*c*) that is positioned on an opposite end of the center shaft (553) to receive the rotation force from the main pulley secondary gear (511*b*), and installed with one or more pawl shafts (720*c*) each having a pawl (58R3) disposed thereon, in which the pawl (58R3) engages with the latch wheel idle gear (750R3) in a predetermined condition, a pawl shaft guide hole (59*c*) that is positioned between the latch wheel idle gear (750R3) and the pawl shaft fixing idle gear (760*c*) and through which the pawl shaft (720*c*) passes, a pawl guide idle disc (740R3) that is provided with one or more pawl guide grooves (56R3) which make contact with the pawl shaft guide hole (59*c*) to control a movement of the pawl (58R3) in a predetermined condition, a return bar spring (57*c*) that is fixed to the center shaft (553) to return the pawl shaft (720*c*) to a predetermined position of the pawl shaft guide hole (59*c*) when there is no rotation load on the pawl shaft (720*c*), and a deceleration roller (60*a*) that generates a load based on a rotation speed of the pawl guide idle disc (740R3); and a unidirectional complex clutch L (506) including the center shaft (554) that is installed to idle on the partition plate (130), which is provided inside the bottom surface of the upper plate (110) of the body frame (100) formed with the plurality of shaft holes (150), a latch wheel idle gear (750L1) that is provided with a latch wheel, which idles on one end of the center shaft (554) to transmit counterclockwise rotation to one side thereof, and transmits the rotation force to the main pulley secondary gear (512*b*) through the engaged connection gear set (240), a pawl shaft fixing idle gear (760*d*) that is positioned on an opposite end of the center shaft (554) to receive the rotation force from the auxiliary pulley secondary gear (511*d*), and installed with one or more pawl shafts (720*d*) each having a pawl (58L1) disposed thereon, in which the pawl (58L1) engages with the latch wheel idle gear (750L1) in a predetermined condition, a pawl shaft guide hole (59*d*) that is positioned between the latch wheel idle gear (750L1) and the pawl shaft fixing idle gear (760*d*) and through which the pawl shaft (720*d*) passes, a pawl guide idle disc (740L1) that is provided with one or more pawl guide grooves (56L1) which make contact with the pawl shaft guide hole (59*d*) to control a movement of the pawl (58L1) in a predetermined condition, a return bar spring (57*d*) that is fixed to the center shaft (554) to return the pawl shaft (720*d*) to a predetermined position of the pawl shaft guide hole (59*d*) when there is no rotation load on the pawl shaft (720*d*), and a deceleration roller (60*b*) that generates a load based on a rotation speed of the pawl guide idle disc (740L1).

3. The dual blind curtain of claim 1, wherein each of the first and second rotation direction selection parts (501 and 502) is provided with a bidirectional complex clutch (507) including: an idle sprocket (710) that has one or more pawl shaft control grooves (711 and 712) provided on both sides thereof at a position spaced apart from each other in an opposite direction around the center shaft (551) installed to idle on the partition plate (130), which is provided inside the bottom surface of the upper plate (110) of the body frame (100) and formed with the plurality of shaft holes (150); latch wheel idle gears (750R1 and 750R2) that are installed to face a same component based on the idle sprocket (710), are first provided with latch wheels which idle on opposite ends of the center shaft (551) to transmit unidirectional rotation to one side thereof, and transmits a generated rotation force to another shaft; pawl shaft fixing idle gears (730*a* and 730*b*) that are positioned on both sides of the idle sprocket (710), and installed with one or more pawl shafts (720*a* and 720*b*) having pawls (58R1 and 58R2) disposed thereon, in which the pawls (58R1 and 58R2) are inserted into the pawl shaft control grooves (711 and 712) to receive the rotation force and engage with the latch wheel idle gears (750R1 and 750R2) in a predetermined condition; pawl shaft guide holes (59*a* and 59*b*) that are positioned between the latch wheel idle gears (750R1 and 750R2) and the pawl shaft fixing idle gears (730*a* and 730*b*), respectively and through which the pawl shafts (720*a* and 720*b*) pass; pawl guide idle discs (740R1 and 740R2) that are provided with one or more pawl guide grooves (56R1 and 56R2) which make contact with the pawl shaft guide holes (59*a* and 59*b*) to control a movement of the pawls (58R1 and 58R2) in a predetermined condition; and return bar springs (57*a* and 57*b*) that are installed on the center shaft (551) to return the pawl shafts (720*a* and 720*b*) to a predetermined position of the pawl shaft guide holes (59*a* and 59*b*) when there is no rotation load on the pawl shafts (720*a* and 720*b*).

4. A dual blind curtain comprising:

a body frame (100) including an upper plate (110) that forms an upper surface, side plates (120) that are provided on both sides of a bottom surface of the upper plate (110) and formed with a plurality of shaft holes (150), and one or more partition plates (130) that are provided inside the bottom surface of the upper plate (110) and formed with a plurality of shaft holes (150);

a B driving part (200) comprising: a first rotation direction selection part (501) including a center shaft (551) that is installed to idle on the partition plate (130), which is provided inside the bottom surface of the upper plate (110) of the body frame (100) and formed with the plurality of shaft holes (150), and provided on an outer circumferential surface thereof with a locking protrusion (55-1), a center sprocket (571) that is installed on one side of the center shaft (551) and provided with a ball chain (571*c*) to generate a rotation force, a second idle gear clutch (521*b*) that is installed to idle around the center shaft (551), provided with a unidirectional connection port (52-*b*) in one side thereof, and engaged with a main pulley primary gear (511*a*), a first idle gear clutch (521*a*) that idles on the center shaft (551), is provided with a unidirectional connection port (52-*a*) in one side thereof to face the second idle gear clutch (521*b*) at a predetermined interval, and engages with an auxiliary pulley primary gear (511*c*), a center nut (531) that is positioned between the first and second idle gear clutches (521*a* and 521*b*), provided with a nut groove (53-1) in an inner surface of a body thereof, and installed so that the body idles at the shaft hole (150) of the partition plate (130), and a center bolt (541) that rotates in an inner portion of the center nut (531), has a sliding hole (54-2) formed in a center of a body thereof to move left and right of the locking protrusion (55-1), is provided with unidirectional connection ports (54-*a* and 54-*b*) on both sides of a bolt body (54-1), respectively, and is provided with a bolt thread (54-3) on an outer circumferential surface of the bolt body (54-1); a main pulley shaft (27B1) that is installed to idle on the partition plate (130), which is provided inside the bottom surface of the upper plate (110) of the body frame (100) and formed with the plurality of holes (150); a main pulley (26B1) that is constantly coupled to the main pulley shaft (27B1) and rotates; the main pulley primary gear (511*a*) that engages with the second idle gear clutch (521*b*) of the first rotation direction selection part (501) to transmit the rotation force to the main pulley (26B1); a winding rod connection port (290*a*) that connects the rotation force generated in the main pulley (26B1) to a winding rod (630*a*); an auxiliary pulley (26B2) that is constantly coupled to an auxiliary pulley shaft (27B2) and rotates, in which the auxiliary pulley (26B2) is installed to idle on the partition plate (130), which is provided inside the bottom surface of the upper plate (110) of the body frame (100) and formed with the plurality of shaft holes (150); an auxiliary pulley primary gear (511*c*) that engages with the first idle gear clutch (521*a*) of the first rotation direction selection part (501) to transmit the rotation force to the auxiliary pulley (26B2); an auxiliary pulley secondary gear (511*d*) that engages with pawl shaft fixing idle gears (760*c*, 760*d*) of a connection driving part (400) and transmits the rotation force transmitted to the auxiliary pulley (26B2); and the tape belt B (28B) that connects the rotation force of the main pulley (26B1) or the rotation force of the auxiliary pulley (26B2) to each other and is connected to central axes of the main pulley (26B1) and the auxiliary pulley (26B2) to be wound in a stacked manner; a D driving part (300) including: a main pulley shaft (27D1) that is installed to idle on the partition plate (130), which is provided inside the bottom surface of the upper plate (110) of the body frame (100) and formed with the plurality of holes (150); a main pulley secondary gear (512*b*) that is installed on one end of the main pulley shaft (27D1) and connected to latch wheel idle gears (750R3 and 750L1) of the connection driving part (400); a center sprocket (572) that is installed on the main pulley shaft (27D1) and provided with a ball chain (572*c*) to generate the rotation force; and a winding rod connection port (290*b*) connects the rotation force generated in the main pulley shaft (27D1) to a winding rod (630*b*); the connection driving part (400) comprising: a unidirectional complex clutch R (505) including a latch wheel idle gear (750R3) that is provided with a latch wheel, which idles on one end of a center shaft (553) to transmit clockwise rotation to one side thereof, and engaged with the main pulley secondary gear (512*b*) to transmit the rotation force, in which the center shaft (553) is installed to idle on the partition plate (130), which is provided inside the bottom surface of the upper plate (110) of the body frame (100) and formed with the plurality of shaft holes (150), a pawl shaft fixing idle gear (760*c*) that is positioned on an opposite end of the center shaft (553) to receive the rotation force from the auxiliary pulley secondary gear (511*d*), and installed with one or more pawl shafts (720*c*) each having a pawl (58R3) disposed thereon, in which the pawl (58R3) engages with the latch wheel idle gear (750R3) in a predetermined condition, a pawl shaft guide hole (59*c*) that is positioned between the latch wheel idle gear (750R3) and the pawl shaft fixing idle gear (760*c*) and through which the pawl shaft (720*c*) passes, a pawl guide idle disc (740R3) that is provided with one or more pawl guide grooves (56R3) which make contact with the pawl shaft guide hole (59*c*) to control a movement of the pawl (58R3) in a predetermined condition, a return bar spring (57*c*) that is fixed to the center shaft (553) to return the pawl shaft (720*c*) to a predetermined position of the pawl shaft guide hole (59*c*) when there is no rotation load on the pawl shaft (720*c*), and a deceleration roller (60*a*) that generates a load based on a rotation speed of the pawl guide idle disc (740R3); and the unidirectional complex clutch L (506) including a latch wheel idle gear (750L1) that is provided with a latch wheel, which idles on one end of a center shaft (554) to transmit counterclockwise rotation to one side thereof, and engaged with the main pulley secondary gear (512*b*) to transmit the rotation force, in which the central shaft (554) is installed to idle on the partition plate (130), which is provided inside the bottom surface of the upper plate (110) of the body frame (100) and formed with the plurality of shaft holes (150), a pawl shaft fixing idle gear (760*d*) that is positioned on an opposite end of the center shaft (554) to receive the rotation force from the auxiliary pulley secondary gear (511*d*), and installed with one or more pawl shafts (720*d*) each having a pawl (58L1) disposed thereon, in which the pawl (58L1) engages with the latch wheel idle gear (750L1) in a predetermined condition, a pawl shaft guide hole (59*d*) that is positioned between the latch wheel idle gear (750L1) and the pawl shaft fixing idle gear (760*d*) and through which the pawl shaft (720*d*) passes, a pawl guide idle disc (740L1) that is provided with one or more pawl guide grooves (56L1) which make contact with the pawl shaft guide hole (59*d*) to control a movement of the pawl (58L1) in a predetermined condition, a return bar spring (57*d*) that is fixed to the center shaft (554) to return the pawl shaft (720*d*) to a predetermined position of the pawl shaft guide hole (59*d*) when there is no rotation load on the pawl shaft (720*d*), and a deceleration roller (60*b*) that generates a load based on a rotation speed of the pawl guide idle disc (740L1); and a curtain part (600) installed to idle on the side plate (120) and the partition plate (130), which is provided inside the bottom surface of the upper plate (110) of the body frame (100) and formed with the plurality of shaft holes (150), and including a curtain sheet (610) that is made by connecting one or more various pattern sheets and has one end wound around the winding rod (630*a*) connected by the winding rod connection ports (290*a* and 290*b*) and an opposite end wound around another winding rod (630*b*) by the rotation force of the main pulley shaft (27B1 and 27D1), and a weight bar (620) that is formed on a center of the curtain sheet (610) wound around opposite ends thereof.

5. A dual blind curtain comprising:

a body frame (100) including an upper plate (110) that forms an upper surface, side plates (120) that are provided on both sides of a bottom surface of the upper plate (110) and formed with a plurality of shaft holes (150), and one or more partition plates (130) that are provided inside the bottom surface of the upper plate (110) and formed with a plurality of shaft holes (150); a B driving part (200) comprising: a first rotation direction selection part (501) including a unidirectional complex clutch L2 (509) which includes a center shaft (551) that is installed to idle on the partition plate (130), which is provided inside the upper plate (110) of the body frame (100) and formed with the plurality of shaft holes (150), a center sprocket (571) that is installed on one side of the center shaft (551) and provided with a ball chain (571*c*) to generate a rotation force, a center gear (561) that transmits the rotation force of the center sprocket (571) to pawl shaft fixing idle gears (760*e* and 760*f*) of the unidirectional complex clutch R2 (508) and the unidirectional complex clutch L2 (509), respectively, a latch wheel fixing rotation gear (750L2) that is provided with a latch wheel, which is installed on one end of the auxiliary pulley shaft (27B2) to transmit counterclockwise rotation to one side thereof, in which the auxiliary pulley shaft (27B2) is installed to idle on the partition plate (130), which is provided on the inner side of the bottom surface of the upper plate (110) of the body frame (100) and formed with the plurality of shaft holes (150), a pawl shaft fixing idle gear (760*f*)

that is positioned on an opposite end of the auxiliary pulley shaft (27B2) to receive the rotation force from the center gear (561), and installed with one or more pawl shafts (720*f*) each having a pawl (58L2) disposed thereon, in which the pawl (58L2) engages with the latch wheel fixing rotation gear (750L2) in a predetermined condition, a pawl shaft guide hole (59*f*) that is positioned between the latch wheel fixing rotation gear (750L2) and the pawl shaft fixing idle gear (760*f*) and through which the pawl shaft (720*f*) passes, a pawl guide idle disc (740L2) that is provided with one or more pawl guide grooves (56L2) which make contact with the pawl shaft guide hole (59*f*) to control a movement of the pawl (58L2) in a predetermined condition, a return circular spring (57*f*) that is installed on one side of the pawl guide idle disc (740L2) to idle with respect to a shaft to return the pawl shaft (720*f*) to a predetermined position of the pawl shaft guide hole (59*f*) when there is no rotation load on the pawl shaft (720*f*), and a deceleration roller (60*d*) that generates a load based on a rotation speed of the pawl guide idle disc (740L2), and the complex clutch R2 (508) which includes a latch wheel fixing rotation gear (750R4) that is provided with a latch wheel provided on one end of the main pulley shaft (27B1) to transmit clockwise rotation to one side thereof, and transmits the rotation force to a shaft, in which the main pulley shaft (27B1) is installed to idle on the partition plate (130), which is provided inside the bottom surface of the upper plate (110) of the body frame (100) has and formed with the plurality of shaft holes (150), a pawl shaft fixing idle gear (760*e*) that is positioned on an opposite end of the main pulley shaft (27B1) to receive the rotation force from the center gear (561), and installed with one or more pawl shafts (720*e*) each having a pawl (58R4) disposed thereon, in which the pawl (58R4) engages with the latch wheel fixing rotation gear (750R4) in a predetermined condition, a pawl shaft guide hole (59*e*) that is positioned between the latch wheel fixing rotation gear (750R4) and the pawl shaft fixing idle gear (760*e*) and through which the pawl shaft (720*e*) passes, a pawl guide idle disc (740R4) that is provided with one or more pawl guide grooves (56R4) which make contact with the pawl shaft guide hole (59*e*) to control a movement of the pawl (58R4) in a predetermined condition, a return circular spring (57*e*) that is installed on one side of the pawl guide idle disc (740R4) to idle with respect to a shaft to return the pawl shaft (720*e*) to a predetermined position of the pawl shaft guide hole (59*e*) when there is no rotation load on the pawl shaft (720*e*), and a deceleration roller (60*c*) that generates a load based on a rotation speed of the pawl guide idle disc (740R4); a main pulley (26B1) that is constantly coupled to the main pulley shaft (27B1) and rotates; a winding rod connection port (290*a*) that connects the rotation force generated in the main pulley (26B1) to a winding rod (630*a*); an auxiliary pulley (26B2) that is constantly coupled to the auxiliary pulley shaft (27B2) and rotates; a winding rod connection port (290*b*) that connects the rotation force transmitted to the auxiliary pulley (26B2) to a winding rod (630*b*); and the tape belt B (28B) that connects the rotation force of the main pulley (26B1) or the rotation force of the auxiliary pulley (26B2) to each other and is connected to central axes of the main pulley (26B1) and the auxiliary pulley (26B2) to be wound in a stacked manner; and a curtain part (600) installed to idle on the side plate (120) and the partition plate (130), which is provided inside the bottom surface of the upper plate (110) of the body frame (100) and formed with the plurality of shaft holes (150), and including a curtain sheet (610) that is made by connecting one or more various pattern sheets and has one end wound around the winding rod (630*a*) connected by the winding rod connection ports (290*a* and 290*b*) and an opposite end wound around another winding rod (630*b*) by the rotation force of the main pulley shaft (27B1 and 27D1), and a weight bar (620) that is formed on a center of the curtain sheet (610) wound around opposite ends thereof.

* * * * *